US011194891B2

(12) United States Patent
Matsuda

(10) Patent No.: US 11,194,891 B2
(45) Date of Patent: Dec. 7, 2021

(54) PRINTER AND NON-TRANSITORY COMPUTER-READABLE RECORDING MEDIUM STORING COMPUTER-READABLE INSTRUCTIONS FOR PRINTER

(71) Applicant: BROTHER KOGYO KABUSHIKI KAISHA, Nagoya (JP)

(72) Inventor: Munehisa Matsuda, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 140 days.

(21) Appl. No.: 16/750,592

(22) Filed: Jan. 23, 2020

(65) Prior Publication Data

US 2020/0265126 A1 Aug. 20, 2020

(30) Foreign Application Priority Data

Feb. 20, 2019 (JP) .............................. JP2019-028850

(51) Int. Cl.
*G06F 3/12* (2006.01)
*G06F 21/31* (2013.01)
(52) U.S. Cl.
CPC ............ *G06F 21/31* (2013.01); *G06F 3/1203* (2013.01); *G06F 3/1273* (2013.01)
(58) Field of Classification Search
CPC ...... G06F 21/31; G06F 3/1203; G06F 3/1273; G06F 3/1222; G06F 3/1285; G06F 21/608
See application file for complete search history.

(56) References Cited

U.S. PATENT DOCUMENTS

2008/0112010 A1\* 5/2008 Matsuo ................. G06F 3/1286
358/1.15
2016/0094727 A1 3/2016 Sawada
(Continued)

FOREIGN PATENT DOCUMENTS

JP 2016-072785 A 5/2016
JP 2017-007112 A 1/2017

OTHER PUBLICATIONS

IPP Privacy Attributes v1.0 (Privacy), The Printer Working Group, Apr. 12, 2018, pp. 1-16.

*Primary Examiner* — Huo Long Chen
(74) *Attorney, Agent, or Firm* — Scully, Scott, Murphy & Presser, PC

(57) ABSTRACT

A printer may receive a history request according to IPP from a first external device, execute an authentication process. The printer may determine whether a specific user identified by first user identification information included in first input information is a disclosure-targeted user indicated by disclosure user information. The printer may, in a case where it is determined that first authentication information in a memory matches second authentication information and it is determined that the specific user is the disclosure-targeted user, send according to the IPP print history information including restricted history information and non-restricted history information to the first external device. The printer may, in a case where it is determined that the first authentication information matches the second authentication information and it is determined that the specific user is not the disclosure-targeted user, send according to the IPP the non-restricted history information to the first external device.

13 Claims, 15 Drawing Sheets

(56) References Cited

U.S. PATENT DOCUMENTS

2016/0295057 A1\* 10/2016 Miyake .............. H04N 1/32502
2016/0373606 A1    12/2016 Ito
2020/0341708 A1\* 10/2020 Kaneda ................... B41J 29/38

\* cited by examiner

FIG. 2

Print Information Table 38

| Job Information | | | | Document Information | | | | Printing Flag |
|---|---|---|---|---|---|---|---|---|
| Job ID | Job Name | Print Status | Job Status | User Name | Document ID | Document Name | Document Status | User Name | |
| J0 | JN0 | Color Printing | Done | UN0 | D0 | aaa | Done | UN0 | OFF |

User Table 40

| User Name | Password |
|---|---|
| UN0 | P0 |
| UN1 | P1 |

Disclosure Restriction Table 42

| Disclosure Restriction Information | Disclosure User Information |
|---|---|
| - | - |

(Print Process: Case A (IPP Authentication Flag "OFF"))

(History Information Sending Process: Case A (IPP Authentication Flag "OFF"))

(History Information Sending Process: Case B (IPP Authentication Flag "ON"))

PRINTER AND NON-TRANSITORY COMPUTER-READABLE RECORDING MEDIUM STORING COMPUTER-READABLE INSTRUCTIONS FOR PRINTER

CROSS-REFERENCE TO RELATED APPLICATION

This application claims priority to Japanese Patent Application No. 2019-028850, filed on Feb. 20, 2019, the entire contents of which are hereby incorporated by reference into the present application.

TECHNICAL FIELD

The description herein discloses an art related to a printer configured capable of executing printing according to Internet Printing Protocol (IPP).

BACKGROUND ART

A technique is known in which a printer receives a print job from a portable terminal according to IPP and executes printing. The printer executes a so-called IPP authentication prior to receiving the print job from the portable terminal, and receives the print job from the portable terminal when the IPP authentication succeeds.

Further, normally, the printer is configured to store print history information (such as a job name and print settings) related to printing in response to executing the printing. "IPP Privacy Attributes v.1.0", The Printer Working Group, 2018 describes an art for restricting disclosure of stored print history information to a non-disclosure-targeted user. Due to this, for example, the print history information can be disclosed only to a user that caused the printing to be executed (hereinbelow termed "print executing user"). Here, the following configuration may be assumed for realization of the disclosure of the print history information only to the print executing user. That is, the printer stores user identification information (such as a user name) for identifying the print executing user in association with the print history information. When sending of the print history information is requested from an external device, the printer determines whether user identification information included in the request and the user identification information associated with the stored print history information match each other. In a case of determining that the two user identification information match, the printer sends the print history information to the external device, and in a case of determining that the two user identification information do not match, the printer does not send the print history information to the external device. By doing so, the print history information can be disclosed only to the print executing user, and the print history information can be suppressed from being obtained by a third party that is different from the print executing user.

SUMMARY

However, in the above configuration, when the user identification information is obtained by the third party, for example, the third party can acquire the print history information by using the user identification information.

The description herein discloses an art configured to suppress restricted history information, of which disclosure to a non-disclosure-targeted user is restricted, from being obtained by the non-disclosure-targeted user.

A printer disclosed herein may comprise a processor; and a memory storing print history information, first authentication information, disclosure restriction information, and disclosure user information, wherein the print history information is stored in the memory by execution of a printing according to Internet Printing Protocol (IPP) at the printer, and includes restricted history information and non-restricted history information, the restricted history information being information of which disclosure to a non-disclosure-targeted user is restricted, and the non-restricted history information being information of which disclosure to the non-disclosure-targeted user is not restricted, the disclosure restriction information is for the printer to identify the restricted history information and the non-restricted history information in the print history information, and the disclosure user information indicates a disclosure-targeted user of the restricted history information, wherein the memory further stores computer-readable instructions therein, and the computer-readable instructions, when executed by the processor, cause the printer to: receive a history request according to the IPP from a first external device, the history request being for requesting sending of the print history information; execute an authentication process, wherein the authentication process includes: in a case where the history request is received from the first external device, sending an input information request to the first external device, the input information request being for requesting sending of input information; in a case where the input information request is sent to the first external device, receiving first input information including first user identification information inputted to the first external device and second authentication information inputted to the first external device from the first external device; and in a case where the first input information is received from the first external device, determining whether the first authentication information in the memory matches the second authentication information included in the first input information; in the case where the first input information is received from the first external device, determine whether a specific user identified by the first user identification information included in the first input information is the disclosure-targeted user indicated by the disclosure user information; in a case where it is determined that the first authentication information matches the second authentication information and it is determined that the specific user is the disclosure-targeted user, send according to the IPP the print history information including the restricted history information and the non-restricted history information to the first external device as a response to the history request, wherein in a case where it is determined that the first authentication information does not match the second authentication information, the print history information is not sent; and in a case where it is determined that the first authentication information matches the second authentication information and it is determined that the specific user is not the disclosure-targeted user, send according to the IPP the non-restricted history information to the first external device as a response to the history request.

A computer program for realizing the printer as above and a computer-readable recording medium storing the computer program are also novel and useful. Further, a method executed by the printer as above is also novel and useful. Further, a communication system that comprises the printer as above and another device (such as a first external device) is also novel and useful.

BRIEF DESCRIPTION OF THE DRAWINGS

FIG. 2 shows an example of respective tables of a printer.

EMBODIMENTS (Configuration of Communication System 2; FIG. 1)

As shown in FIG. 1, a communication system 2 comprises a printer 10 and a plurality of personal computers (PCs) 100, 200. Each of the devices 10, 100, 200 is configured capable of communicating with each other through a local area network (LAN) 6. The LAN 6 may be a wired LAN or a wireless LAN.

(Configuration of Printer 10)

Figure 1:
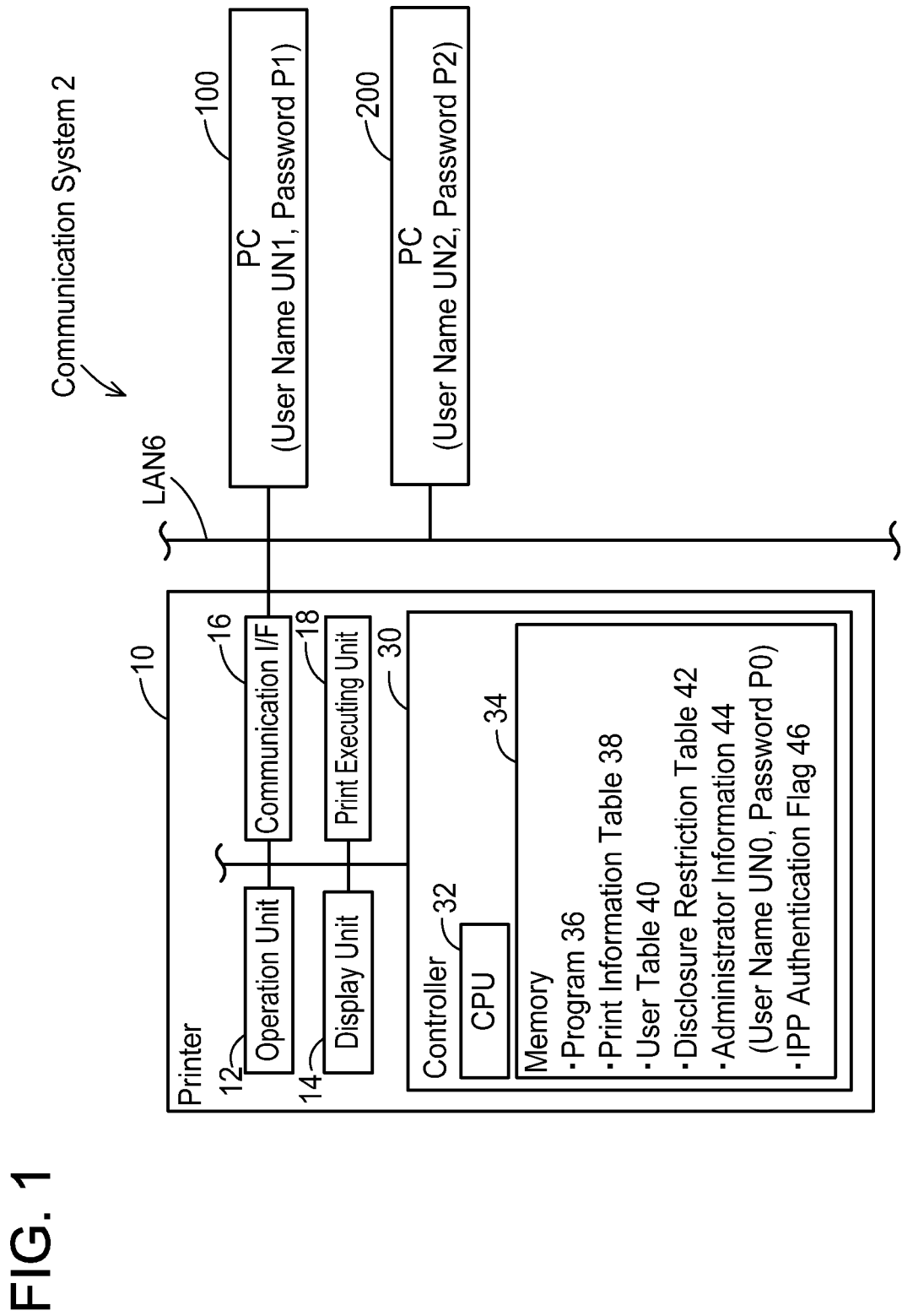
FIG. 1 shows a configuration of a communication system.

The printer 10 is a peripheral device configured to execute a print function (that is, a peripheral device of the respective PCs 100, 200). The printer 10 may be a multi-function device configured to execute a scan function, a FAX function, and the like in addition to the print function. The printer 10 is configured to execute printing by a procedure according to IPP. The IPP is a standard technology that realizes printing to be executed by a printer through a TCP/IP network, which is represented by the Internet, and defines a communication procedure (that is, protocol) for causing the printer to execute printing. IPP standard specifications are published by Printer Working Group (PWG), which is a working group dedicated to the printing-related area in the Internet Engineering Task Force (IETF).

The printer 10 comprises an operation unit 12, a display unit 14, a communication interface 16, a print executing unit 18, and a controller 30. The respective units 12 to 30 are connected by a bus line (reference sign omitted). Hereinbelow, an interface will be denoted "I/F".

The operation unit 12 is provided with a plurality of keys. A user may provide various instructions to the printer 10 by operating the operation unit 12. The display unit 14 is a display for displaying various types of information. The display unit 14 may function as a so-called touch panel (that is, as an operation unit). The communication I/F 16 is connected to the LAN 6. The print executing unit 18 is provided with a print mechanism such as an inkjet scheme or a laser scheme for example.

The controller 30 is provided with a CPU 32 and a memory 34. The CPU 32 is a processor configured to execute various processes according to a program 36 stored in the memory 34. The memory 34 is configured of a ROM and a RAM. In addition to the program 36 as above, the memory 34 further stores a print information table 38, a user table 40, a disclosure restriction table 42, administrator information 44, and an IPP authentication flag 46.

The administrator information 44 is information related to an administrator of the printer 10 (hereinbelow simply termed "administrator"). The administrator information 44 includes a user name UN0 for identifying the administrator and a password P0 used for authentication in communication according to the IPP. The IPP authentication flag (hereinbelow simply termed "flag") 46 indicates one of "ON" that indicates that the printer 10 executes an IPP authentication using a user name and a password and "OFF" that indicates that the printer 10 does not execute the IPP authentication in the communication according to the IPP. When the printer 10 is shipped, the flag 46 indicates "OFF".

(Configurations of Respective PCs 100, 200)

Respective PCs 100, 200 are desktop type PCs, however, in a variant, they may be portable devices such as notebook PCs. In the present embodiment, a situation is assumed in which the PCs 100, 200 are used by different users. The PC 100 stores a user name UN1 for identifying the user of the PC 100 and a password P1. The PC 200 stores a user name UN2 for identifying the user of the PC 200 and a password P2. Hereinbelow, the user of the PC 100 and the user of the PC 200 are respectively termed "first user" and "second user".

(Respective Tables 38, 40, 42; FIG. 2)

Next, the respective tables 38, 40, 42 will be described with reference to FIG. 2. The print information table 38 stores print information that is stored by the printer 10 executing printing according to the IPP in response to an instruction from a PC (such as 100). The print information is information indicating a print history, and specifically, it includes job information, document information, and a printing flag. The job information includes a job ID, a job name, print settings, a job state, and a user name. The job ID is information for identifying the job information. The job name is a name of the job information, and in the present embodiment, it is a name of a program of the PC (such as 100) that had instructed printing, being a program that created a document representing a print target image (that is, image data). The print settings are settings used in the printing, and includes a number of print colors (such as monochrome print and color print), a paper size, printing resolution, for example. The job state is information indicating a state of execution of the print job. The user name is a name of a user who caused the printer 10 to execute the printing. The document information includes a document ID, a document name, a document state, and a user name. The document ID is information for identifying the document information. The document name is a file name of the document representing the print target image. The document state is information indicating a state of print execution of the image represented by the document. The user name is a name of a user who caused the printer 10 to execute the printing, and matches the user name included in the job information. The printing flag is information indicating a value of the flag 46 when the printing is executed in the printer 10.

In the IPP, information is regarded as an object, and an object type is defined by an attribute. For example, the type of the object corresponding to the job information is defined by an attribute "job-object-attribute", and the type of the object corresponding to the document information is defined by an attribute "document-object-attribute". That is, each piece of information in the job information (that is, the job ID, the job name, the print settings, the job state, and the user name) is information having the attribute "job-object-attribute", and each piece of information in the document information (that is, the document ID, the document name, the document state, and the user name) is information having the attribute "document-object-attribute". In a variant, the job information is not limited to the information as listed above, and may include only some of the information among the above-listed information, and may include other information having the job-object-attribute. Further, the document information is not limited to the information as listed above, and may include only some of the information among the above-listed information, and may include other information having the document-object-attribute.

The user table 40 stores a user name and a password of each user of the printer 10. The user name and the password is registered in the user table 40 by the administrator, for example.

The disclosure restriction table 42 stores disclosure restriction information and disclosure user information in association with each other. The disclosure restriction information is information that indicates an item corresponding to information of which disclosure to a non-disclosure-targeted user is restricted among the information included in the job information and the information included in the document information. Specifically, the disclosure restriction information is information having an attribute "job-privacy-attribute" or an attribute "document-privacy-attribute". The disclosure restriction information having the attribute "job-privacy-attribute" is information indicating an item corresponding to information of which disclosure to the non-disclosure-targeted user is restricted among the information having the attribute "job-object-attribute" (that is, the job information). The disclosure restriction information having the attribute "document-privacy-attribute" is information indicating an item corresponding to information of which disclosure to the non-disclosure-targeted user is restricted among the information having the attribute "document-object-attribute" (that is, the document information). In other words, the disclosure restriction information is information for the printer 10 to identify, among the information included in the job information and the information included in the document information, restricted history information being information of which disclosure to the non-disclosure-targeted user is restricted and non-restricted history information of which disclosure to the non-disclosure-targeted user is not restricted. The restricted history information is so-called private information, whereas the non-restricted history information is so-called public information. Here, a disclosure-targeted user is a user who is indicated by information inputted to an acceptance screen (see FIG. 6) to be described later and is capable of acquiring the restricted history information stored in the printer 10 from the printer 10. Further, the non-disclosure-targeted user is a user who is different from the user indicated by the information inputted to the acceptance screen (see FIG. 6) to be described later and is not allowed to acquire the restricted history information stored in the printer 10 from the printer 10.

The disclosure user information is information indicating the disclosure-targeted user of the restricted history information, and is information including an attribute "job-privacy-scope" or an attribute "document-privacy-scope". The disclosure user information including the attribute "job-privacy-scope" is information indicating the disclosure-targeted user for information corresponding to item(s) indicated by the disclosure restriction information having the "job-privacy-attribute". The disclosure user information including the attribute "document-privacy-scope" is information indicating the disclosure-targeted user for information corresponding to item(s) indicated by the disclosure restriction information having the "document-privacy-attribute". In an initial state of the printer 10, the disclosure restriction table 42 is in an empty state, and the disclosure restriction information and the disclosure user information are stored therein in accordance with execution of an acceptance process to be described later.

Figure 3:
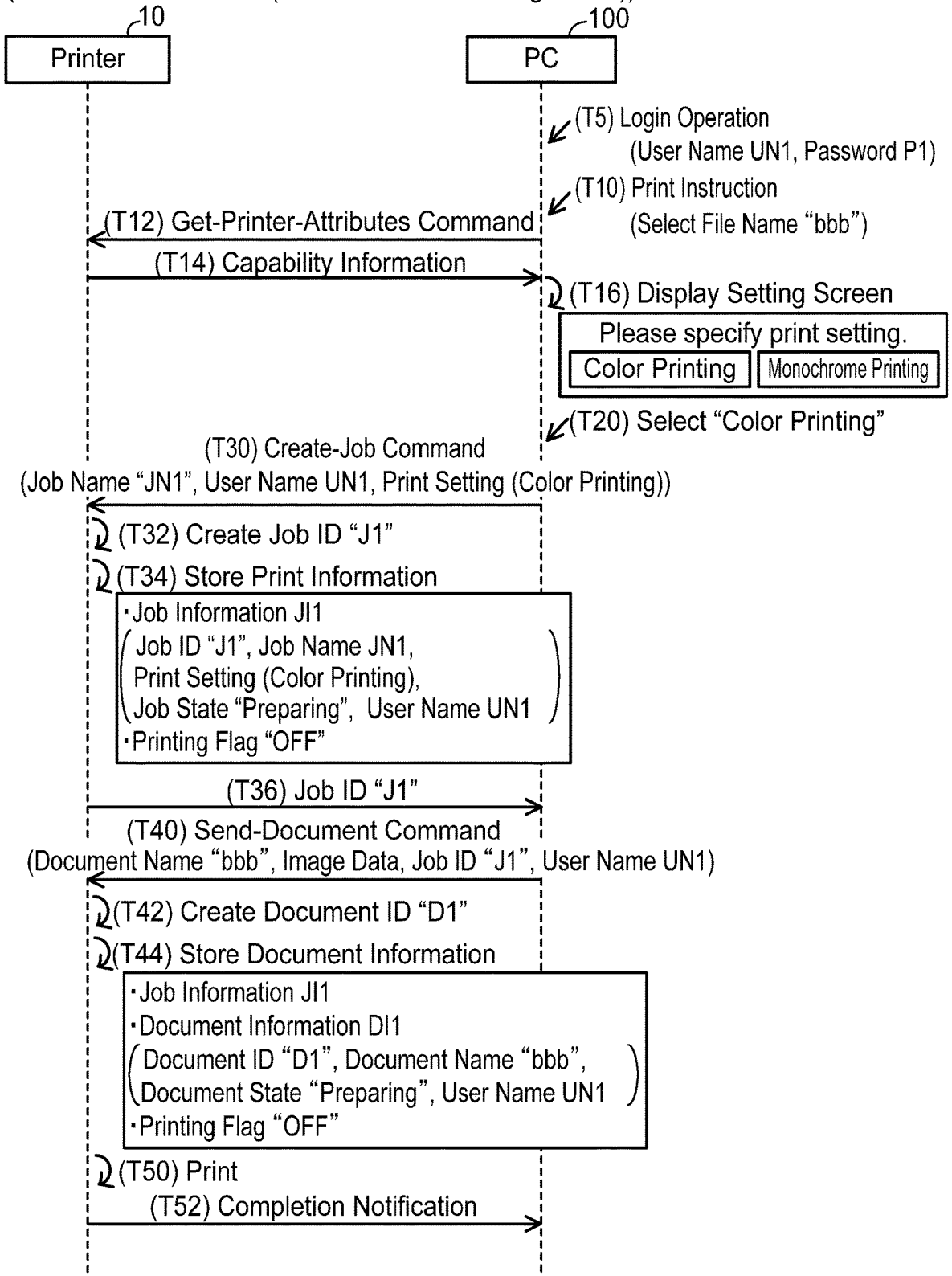
FIG. 3 shows a sequence diagram of a print process in Case A.

(Print Process (Case A); FIG. 3)

Next, the print process of Case A where the flag 46 of the printer 10 indicates "OFF" will be described with reference to FIG. 3. The print process is a process for causing the printer 10 to execute printing according to the IPP. In an initial state of FIG. 3, the flag 46 of the printer 10 indicates "OFF". Further, the disclosure restriction table 42 of the printer 10 is in the empty state. Hereinbelow, for easier understanding, operations executed by CPUs of the respective devices (such as the CPU 32 of the printer 10) will be described with the respective devices (such as the printer 10) as a subject of action instead of describing the CPUs as the subject of action. Further, the printer 10 executes communications hereinbelow through the communication I/F 16. As such, the description "through the communication I/F 16" will be omitted.

In T5, the PC 100 accepts a login operation for logging into the PC 100 from the first user. This login operation includes operations of inputting the user name UN1 and the password P1 of the first user.

In T10, the PC 100 accepts a print instruction for causing the printer 10 to execute the printing according to the IPP from the first user. The print instruction includes an operation of selecting a file name "bbb" of a print target document (that is, image data). In this case, the PC 100 sends a Get-Printer-Attributes command according to the IPP (hereinbelow simply termed "GPA command") to the printer 10 in T12.

In receiving the GPA command from the PC 100 in T12, the printer 10 sends Capability information to the PC 100 in T14, where the Capability information indicates the print settings which the printer 10 can use. In the present embodiment, the Capability information indicates that the printer 10 is capable of executing color printing and monochrome printing. In a variant, the Capability information may further include information indicating paper size(s) which the printer 10 is capable of using, information indicating print resolution(s) which the printer 10 is capable of using, and information indicating file format(s) which the printer 10 is capable of interpreting.

In receiving the Capability information from the printer 10 in T14, the PC 100 displays a settings screen in T16 for selecting the print settings by using the Capability information. The settings screen includes a color printing button and a monochrome printing button.

When the color printing button in the settings screen is selected by the first user in T20, the PC 100 sends a Create-Job command according to the IPP (hereinbelow simply termed "CJ command") to the printer 10 in T30. Here, the IPP is a protocol that uses Hypertext Transfer Protocol (HTTP), and as such, a command according to the IPP is sent as a request signal according to the HTTP, and includes a HTTP header part and a HTTP body part. A body part of the CJ command includes the job name JN1 being a name of the program that created the document selected in T10, the user name UN1 logged in in T5, and the print settings (that is, the color printing) selected in T20.

In receiving the CJ command from the PC 100 in T30, the printer 10 determines in T32 that the print settings (that is, the color printing) included in the CJ command can be used and creates a unique job ID "J1", and stores the print information in the print information table 38 in T34. Specifically, the printer 10 firstly creates job information JI1. The job information JI1 includes the created job ID "J1", the job name JN1 included in the body part of the CJ command, the print settings included in the body part of the CJ command, a job state "preparing" indicating that the printing has not been executed yet, and the user name UN1 included in the body part of the CJ command. Then, the printer 10 determines that the flag 46 stored in the memory 34 indicates "OFF" and creates a printing flag indicating "OFF". Then, the printer 10 stores print information including the created job information JI1 and the created printing flag in the print information table 38. At a time point of T34, the print information does not include document information.

In T36, the printer 10 sends the job ID "J1" to the PC 100.

In receiving the job ID "J1" from the printer 10 in T36, the PC 100 sends a Send-Document command according to the IPP (hereinbelow simply termed "SD command") to the printer 10 in T40. A body part of the SD command includes the document name being the file name "bbb" selected in T10, the image data selected in T10, the received job ID "J1", and the user name UN1 logged in in T5.

In receiving the SD command from the PC 100 in T40, the printer 10 creates a unique document ID "D 1" in T42 and stores document information DI1 in the print information table 38 in T44. Specifically, the printer 10 firstly creates the document information DI1. The document information DI1 includes the created document ID "D 1", the document name "bbb" included in the SD command, the document state "preparing" indicating that the printing has not been executed yet, and the user name UN1 included in the SD command. Then, the printer 10 stores the created document information DI1 in the print information table 38 by associating it with the job information JI1 including the same job ID "J1" as the job ID "J1" included in the SD command.

In T50, the printer 10 causes the print executing unit 18 to execute color printing according to the image data included in the SD command and the print settings (that is, color printing) included in the job information HE When the printing is completed, the printer 10 changes the document state in the document information DI1 stored in T44 to "done" indicating that the printing has been completed, and changes the job state in the job information JI1 stored in T34 to "done" indicating that the printing has been completed. In this case, the printer 10 sends a completion notification indicating that the printing has been completed to the PC 100 in T52. When the process of T52 is completed, the process of FIG. 3 is terminated.

Figure 4:
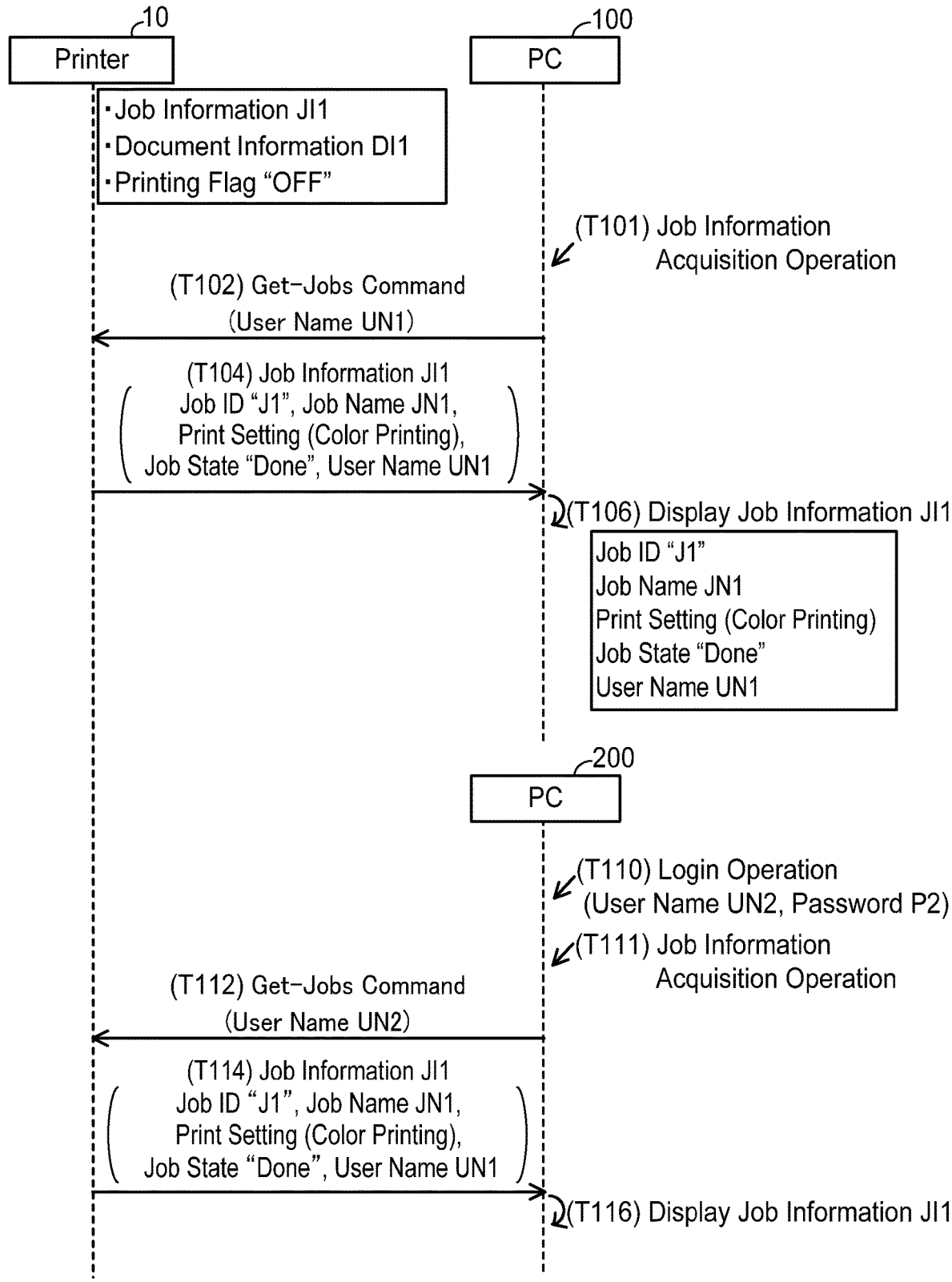
FIG. 4 shows a sequence diagram of a history information sending process in Case A.

(History Information Sending Process (Case A); FIG. 4)

Next, the history information sending process of Case A in which the flag 46 of the printer 10 indicates "OFF" will be described with reference to FIG. 4. The history information sending process is a process for sending job information or document information in print information from the printer 10 to the PC 100 (or 200). The process of FIG. 4 is executed after the process of FIG. 3 has been executed. That is, in an initial state of FIG. 4, the printer 10 stores the print information including the job information JI1, the document information DI1, and the printing flag "OFF". Further, the flag 46 of the printer 10 indicates "OFF".

In receiving a job information acquisition operation that instructs acquiring of the job information from the first user in T101, the PC 100 sends a Get-Jobs command according to the IPP (hereinbelow simply termed "GJ command") to the printer 10 in T102. The GJ command is a command requesting sending of the job information, and specifically, it is a command requesting sending of the information having the job-object-attribute as the attribute. The GJ command includes the user name UN1 logged in in T5 of FIG. 3.

In receiving the GJ command from the PC 100 in T102, the printer 10 sends the job information JI1 to the PC 100 in T104. The job information JI1 includes the job ID "J1", the job name JN1, the print settings (that is, the color printing), the job state "done", and the user name UN1.

In receiving the job information JI1 from the printer 10 in T104, the PC 100 displays the job information JI1 in T106. By doing so, the first user being a user who had caused the printer 10 to execute the printing corresponding to the job information JI1 (hereinbelow termed "print executing user") can acknowledge the information respectively included in the job information JI1.

Further, the PC 200 accepts a login operation including inputs of the user name UN2 and the password P2 of the second user from the second user in T110, and accepts a job information acquisition operation from the second user in T111. In this case, the PC 200 sends a GJ command including the user name UN2 that is logged in in T110 to the printer 10 in T112.

In receiving the GJ command from the PC 200 in T112, the printer 10 sends the job information JR to the PC 200 in T114. As a result, the job information JR is displayed in T116 in the PC 200. Due to this, the second user who is different from the print executing user (that is, the first user) can acknowledge the respective information in the job information JI1. When the process of T116 is completed, the process of FIG. 4 is terminated.

As above, in the situation where the flag 46 of the printer 10 indicates "OFF", the second user can acknowledge all the information in the job information JI1, which is a history of printing executed according to the instruction from the first user. Further, although this is not exemplified as a specific case, the document information DI1 may be sent to the PC 200 by the same process as FIG. 4. In this case, the second user can acknowledge all the information in the document information DI1, which is a history of printing executed according to the instruction from the first user. That is, the second user can acknowledge all the information in the print information including the job information JI1 and the document information DI1. However, there may be a situation in which the first user wishes to keep some information in the print information undisclosed to the second user. To address such a demand, the present embodiment sets the restricted history information of which disclosure to the non-disclosure-targeted user is restricted within the print information, and suppresses the restricted history information from being obtained by the non-disclosure-targeted user.

Figure 5:
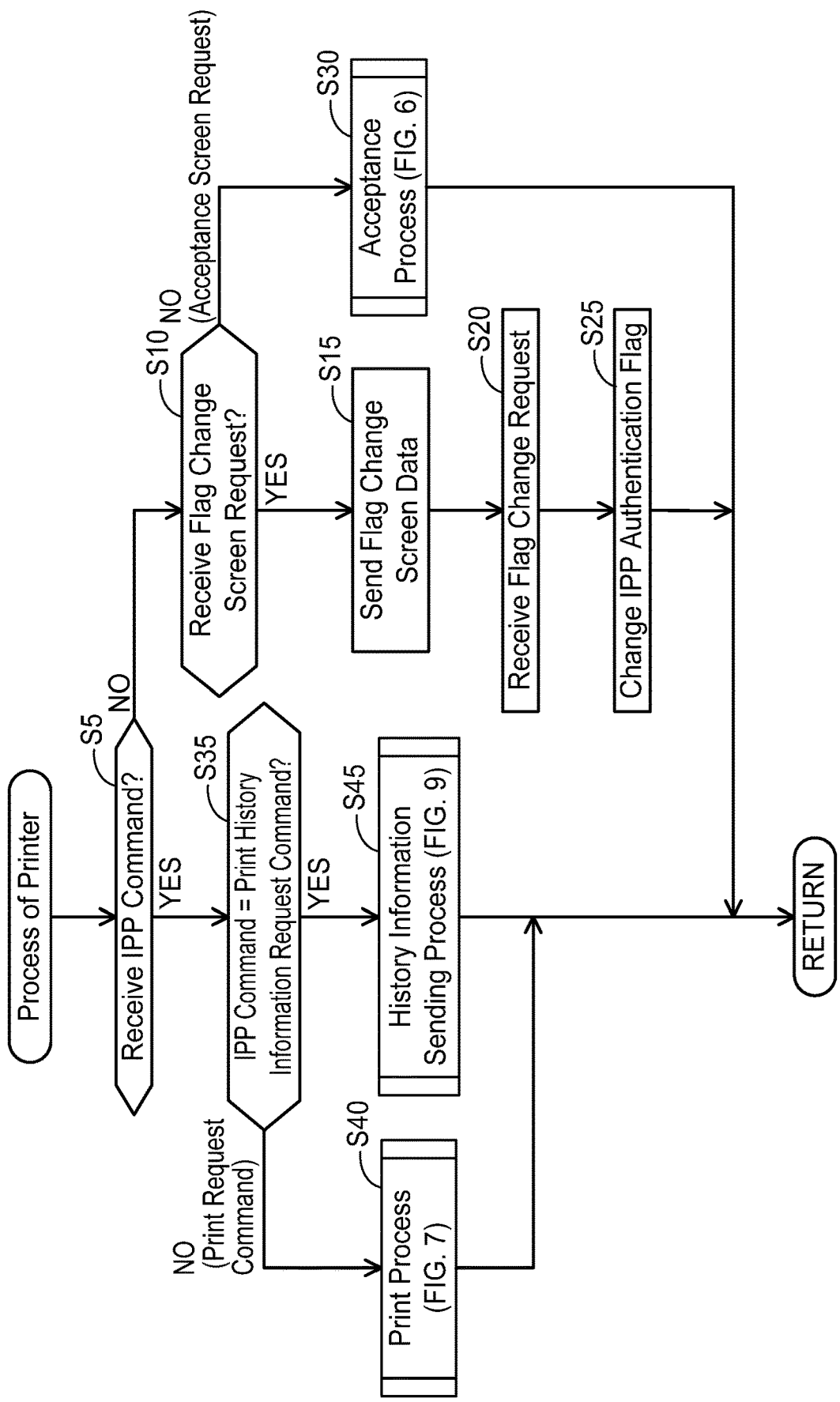
FIG. 5 shows a flowchart of processes executed by the printer.

(Process of Printer; FIG. 5)

Next, processes executed by the CPU 32 of the printer 10 will be described with reference to FIG. 5. The process of FIG. 5 is executed when power of the printer 10 is turned ON.

In S5, the printer 10 determines whether or not an IPP command was received from one of the PCs. The IPP command is a command according to the IPP, and is one of the GPA command, the CJ command, the SD command, the GJ command, a Get-Document-Attributes command (hereinbelow simply termed "GDA command"), and a Get-Job-Attributes command (hereinbelow simply termed "GJA command"). As above, the GJ command is a command that requests sending of the information having the job-object-attribute as its attribute (that is, the job information). The GDA command is a command that requests sending of the document information, and specifically, it is a command that requests sending of the information having the document-object-attribute as the attribute. The GJA command is a command requesting information which is one of the information included in the job information, and specifically, it is a command that requests sending of information designated by the user among the information having the job-object-attribute as their attribute. In a variant, the IPP command may further include a Validate-Job command and a Get-Subscription-Attributes command. In a case of receiving the IPP command, the printer 10 determines YES in S5 and proceeds to S35. On the other hand, in a case of receiving a command that is different from the IPP command (that is, a request signal according to the HTTP and being different from the IPP command), the printer 10 determines NO in S5 and proceeds to S10. Hereinbelow, the PC being a sender of the command which the printer 10 had received in S5 will be termed "target PC".

In S10, the printer 10 determines whether or not the command received in S5 is a flag change screen request. The flag change screen request is a command that requests sending of flag change screen data for displaying a flag change screen. In a case of determining that the command received in S5 is the flag change screen request (YES to S10), the printer 10 proceeds to S15. On the other hand, in a case of determining that the command received in S5 is an acceptance screen request (NO to S10), the printer 10 executes an acceptance process (see FIG. 6) in S30. The acceptance screen request is a command that requests sending of acceptance screen data for displaying an acceptance screen. The acceptance process is a process for accepting inputs of the disclosure restriction information and the disclosure user information from the user. When the process of S30 is completed, the printer 10 returns to S5.

In S15, the printer 10 sends the flag change screen data to the target PC. As a result of this, the flag change screen data is interpreted by a Web browser of the target PC and the flag change screen is displayed in the target PC. The flag change screen is a screen for changing the flag 46 of the printer 10, and includes an OK button indicating to change the flag 46 and a Cancel button indicating not to change the flag 46.

In S20, the printer 10 receives a flag change request from the target PC. The flag change request is sent from the target PC to the printer 10 in a case where the OK button is selected in the flag change screen.

In S25, the printer 10 changes the flag 46 stored in the memory 34. Specifically, the printer 10 changes the flag 46 from "OFF" to "ON" in a case where the flag 46 indicates "OFF" and changes the flag 46 from "ON" to "OFF" in a case where the flag 46 indicates "ON". When the process of S25 is completed, the printer 10 returns to S5.

In S35, the printer 10 determines whether or not the IPP command received in S5 is a print history information request command. The print history information request command is a command that requests the job information or the document information included in the print information, and is one of the GJ command, the GDA command, and the GJA command. In a case of determining that the IPP command received in S5 is the print history information request command (YES to S35), the printer 10 executes a history information sending process (see FIG. 9) in S45. On the other hand, in a case of determining that the IPP command received in S5 is a print request command (NO to S35), the printer 10 executes a print process (see FIG. 7) in S40. When the process of S40 or S45 is completed, the printer 10 returns to S5.

Figure 6:
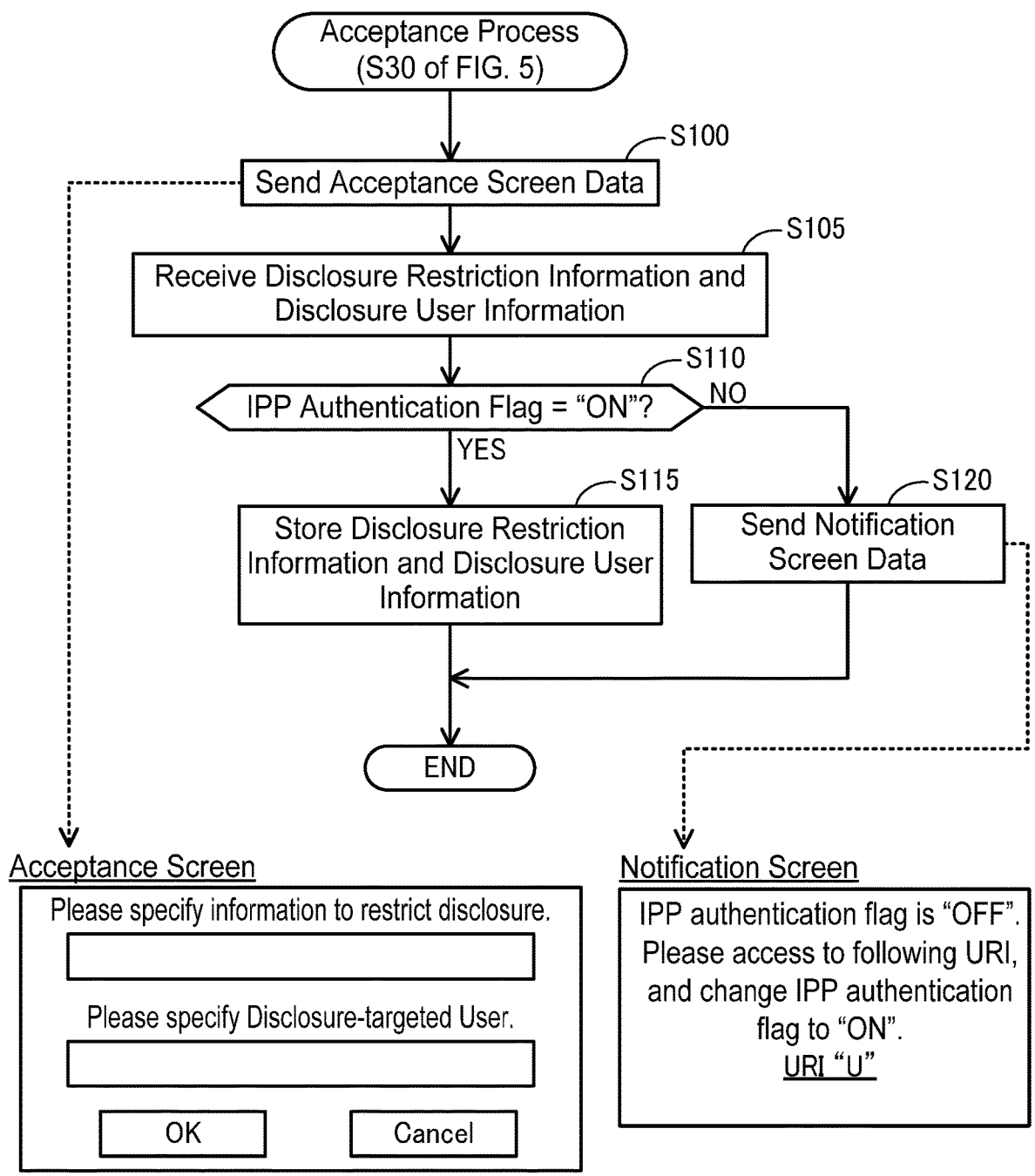
FIG. 6 shows a flowchart of an acceptance process.

(Acceptance Process; FIG. 6)

Next, details of the acceptance process executed in S30 of FIG. 5 will be described with reference to FIG. 6. In S100, the printer 10 sends the acceptance screen data to the target PC. As a result of this, the acceptance screen data is interpreted by the Web browser of the target PC and the acceptance screen is displayed in the target PC. An example of the acceptance screen is shown in FIG. 6. The acceptance screen is a screen for accepting the inputs of the disclosure restriction information and the disclosure user information, and includes a first input box for accepting an input of a name of an item corresponding to one information among the information included in the job information and the information included in the document information, a second input box for accepting an input of the name of the disclosure-targeted user, an OK button, and a Cancel button.

In S105, the printer 10 receives the disclosure restriction information and the disclosure user information from the target PC. Specifically, when the name of the item corresponding to one information among the information included in the job information and the information included in the document information is inputted to the first input box, the name of the disclosure-targeted user is inputted to the second input box, and the OK button is selected in the acceptance screen, the information indicating the item corresponding to the name inputted to the first input box and the information indicating the disclosure-targeted user corresponding to the name inputted to the second input box are sent from the target PC to the printer 10. Due to this, the printer 10 receives the information indicating the item corresponding to the name inputted to the first input box as the disclosure restriction information and receives the information indicating the disclosure-targeted user corresponding to the name inputted to the second input box as the disclosure user information.

In S110, the printer 10 determines whether or not the flag 46 stored in the memory 34 indicates "ON". In a case of determining that the flag 46 indicates "ON" (YES to S110), the printer 10 proceeds to S115. On the other hand, in a case of determining that the flag 46 indicates "OFF" (NO to S110), the printer 10 proceeds to S120.

In S115, the printer 10 stores the disclosure restriction information and disclosure user information in association with each other in the disclosure restriction table 42. When the process of S115 is completed, the process of FIG. 6 is terminated.

In S120, the printer 10 sends notification screen data for displaying a notification screen to the target PC. As a result of this, the notification screen data is interpreted by the Web browser of the target PC and the notification screen is displayed in the target PC. The notification screen is a screen for notifying the user that the flag 46 of the printer 10 is "OFF". Due to this, the user of the target PC can acknowledge that the flag 46 of the printer 10 is "OFF". An example of the notification screen is shown in FIG. 6. The notification screen includes a uniform resource identifier (URI) "U" that indicates a location of the flag change screen data (that is, a directory of the flag change screen data in an internal server of the printer 10). Due to this, the user of the target PC can cause the target PC to display the flag change screen by selecting the URI "U" in the notification screen, and change the flag 46 of the printer 10 from "OFF" to "ON". As such, user convenience is improved. The URI "U" may be generated by the printer 10 when S120 is executed, or may be stored in advance in the memory 34 of the printer 10. When the process of S120 is completed, the process of FIG. 6 is terminated.

Figure 7:
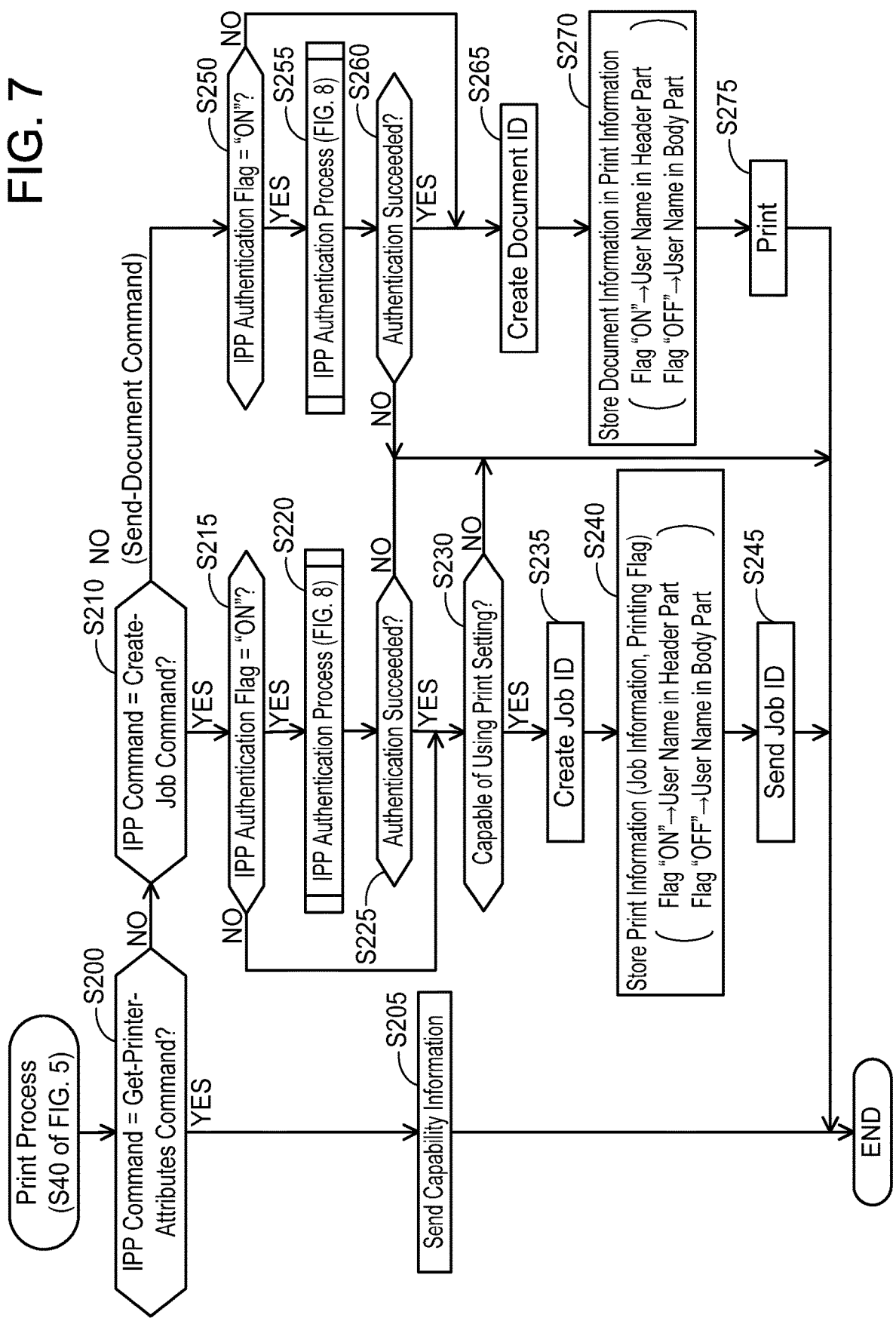
FIG. 7 shows a flowchart of the print process.

(Print Process; FIG. 7)

Next, details of the print process executed in S40 of FIG. 5 will be described with reference to FIG. 7. In S200, the printer 10 determines whether or not the IPP command received in S5 of FIG. 5 is the GPA command. In a case of having received the GPA command in S5 (such as T12 of FIG. 3), the printer 10 determines YES to S200 and proceeds to S205. On the other hand, in case of having received the IPP command different from the GPA command in S5, the printer 10 determines NO to S200 and proceeds to S210.

In S205, the printer 10 sends the Capability information to the target PC (such as T14 of FIG. 3).

In S210, the printer 10 determines whether or not the IPP command received in S5 of FIG. 5 is the CJ command. In a case of having received the CJ command in S5 (such as T30 of FIG. 3), the printer 10 determines YES to S210 and proceeds to S215. On the other hand, in case of having received the SD command in S5 (such as T40), the printer 10 determines NO to S210 and proceeds to S250.

S215 is same as S110 of FIG. 6. The printer 10 proceeds to S220 in a case of determining that the flag 46 indicates "ON" (YES to S215) and proceeds to S230 in a case of determining that the flag 46 indicates "OFF" (NO to S215).

In S220, the printer 10 executes an IPP authentication process. The IPP authentication process is a process for authenticating a device that had sent the IPP command by using the user name and the password.

In S225, the printer 10 determines whether or not the process of S220 was completed as authentication success indicating that the IPP authentication process had succeeded. In a case where the process of S220 was completed as authentication success, the printer 10 determines YES to S225 and proceeds to S230. On the other hand, in a case where the process of S220 was completed as authentication failed indicating that the IPP authentication process had failed, the printer 10 determines NO to S225 and terminates the process of FIG. 7.

In S230, the printer 10 determines whether or not the print settings included in the received CJ command can be used. In a case of determining that that print settings can be used (YES to S230), the printer 10 proceeds to S235. On the other hand, in a case of determining that that print settings cannot be used (NO to S230), the printer 10 sends an error notification indicating that the print settings cannot be used to the target PC and terminates the process of FIG. 7. In a variant, in the case of determining that that print settings included in the CJ command cannot be used (NO to S230), the printer 10 may execute processes of S235 to S275 to be described later by using print settings which the printer 10 can use instead of the print settings included in the CJ command.

In S235, the printer 10 creates a unique job ID (such as T32 of FIG. 3).

In S240, the printer 10 stores the print information including the job information and the printing flag in the print information table 38 (such as T34 of FIG. 3). The job information includes the job ID created in S235, the job name JN1 included in the body part of the CJ command, the print settings included in the body part of the CJ command, the job state, and the user name included in the CJ command. The printer 10 stores the user name in the job information in a case where the user name is included in a header part of the CJ command, and stores the user name included in a body part of the CJ command in the job information in a case where the user name is not included in the header part of the CJ command More specifically, in S240 that is executed after determining YES to S215, the printer 10 stores the user name, which is included in the header part of the CJ command, in the job information, and in S240 that is executed after determining NO to S215, it stores the user name, which is included in the body part of the CJ command, in the job information.

In S245, the printer 10 sends the job ID created in S235 to the target PC. When the process of S245 is completed, the process of FIG. 7 is terminated.

S250 to S260 are same as S215 to S225. In S265, the printer 10 creates a unique document ID (such as T42 of FIG. 3).

In S270, the printer 10 stores the document information in the print information table 38 (such as T44 of FIG. 3). In a case where the user name is included in a header part of the SD command, the printer 10 stores this user name in the job information, and in a case where the user name is not included in the header part of the SD command, the printer 10 stores the user name, which is included in a body part of the SD command, in the job information. More specifically, in S270 that is executed after determining YES to S250, the printer 10 stores the user name, which is included in the header part of the SD command, in the document information, and in S270 that is executed after determining NO to S250, it stores the user name, which is included in the body part of the SD command, in the document information.

In S275, the printer 10 causes the print executing unit 18 to execute printing according to the image data included in the SD command and the print settings included in the job information stored in S240. When the printing is completed, the printer 10 changes the document state in the document information stored in S270 to "done", changes the job state in the job information stored in S240 to "done", and sends the completion notification to the target PC (such as T52 of FIG. 3). When the process of S275 is completed, the process of FIG. 7 is terminated.

Figure 8:
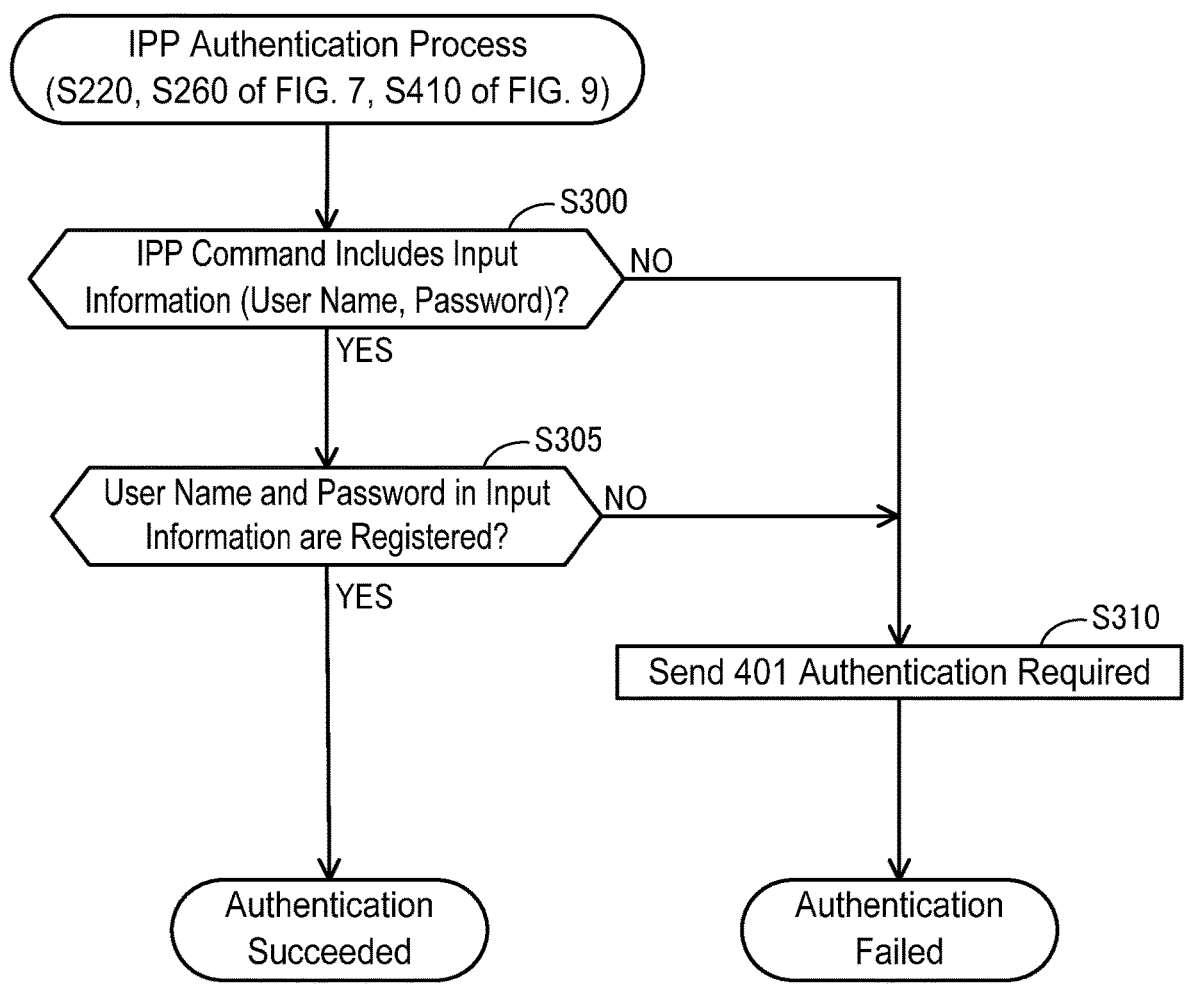
FIG. 8 shows a flowchart of an IPP authentication process.

(IPP Authentication Process; FIG. 8)

Next, details of the IPP authentication process executed in S220, S260 of FIG. 7 and S410 of FIG. 9 to be described later will be described with reference to FIG. 8.

In S300, the printer 10 determines whether or not the input information is included in the header part of the IPP command received in S5. The input information includes the user name and the password inputted by the user in the target PC. In a case where the input information is included in the header part of the IPP command, the printer 10 determines YES to S300 and proceeds to S305. On the other hand, in a case where the input information is not included in the header part of the IPP command, the printer 10 determines NO to S300 and proceeds to S310.

In S305, the printer 10 determines whether or not the combination of the user name and the password included in the input information is registered in the user table 40. In a case of determining that the combination of the user name and the password is registered in the user table 40 (YES to S305), the printer 10 terminates the process of FIG. 8 as authentication succeeded. On the other hand, in a case of determining that the combination of the user name and the password is not registered in the user table 40 (NO to S305), the printer 10 proceeds to S310.

In S310, the printer 10 sends 401 Authorization Required to the target PC. As a result of this, an input screen for inputting the input information is displayed in the target PC. The 401 Authorization Required is a command defined by the HTTP rather than being defined by the IPP. Hereinbelow, this command will simply be termed "401 command". When the process of S310 is completed, the printer 10 terminates the process of FIG. 8 as authentication failed.

(History Information Sending Process; FIG. 9)

Next, details of the history information sending process executed in S45 of FIG. 5 will be described with reference to FIG. 9. In S400, the printer 10 determines whether or not the disclosure restriction information and the disclosure user information are stored in the disclosure restriction table 42. In determining that the disclosure restriction information and the disclosure user information are stored in the disclosure restriction table 42 (YES to S400), that is, in a case where the restricted history information exists, the printer 10 proceeds to S405. On the other hand, in determining that the disclosure restriction information and the disclosure user information are not stored in the disclosure restriction table 42 (NO to S400), that is, in a case where the restricted history information does not exist, the printer 10 proceeds to S430. Due to this, the processes of S405 to S425 are suppressed from being executed despite there being no existing restricted history information. Thus, a processing load on the printer 10 can be reduced.

In S405, the printer 10 determines whether or not the print history information request command received in S5 (being one of the GJ command, the GDA command, and the GJA command) requests the restricted history information. Specifically, when the print history information request command is the GJ command, the printer 10 determines whether or not the disclosure restriction information indicates an item corresponding to one of the information included in the job information (that is, being one of the job ID, the job name, the print settings, the job state, and the user name). The printer 10 determines YES to S405 and proceeds to S410 in a case where the print history information request command is the GJ command and the disclosure restriction information indicates the item corresponding to one of the information included in the job information. On the other hand, the printer 10 determines NO to S405 and proceeds to S430 in a case where the print history information request command is the GJ command and the disclosure restriction information does not indicate any item corresponding to the information included in the job information.

Further, when the print history information request command is the GDA command, the printer 10 determines whether or not the disclosure restriction information indicates an item corresponding to one of the information included in the document information (being one of the document ID, the document name, the document state, and the user name) The printer 10 determines YES to S405 and proceeds to S410 in a case where the print history information request command is the GDA command and the disclosure restriction information indicates the item corresponding to one of the information included in the document information. On the other hand, the printer 10 determines NO to S405 and proceeds to S430 in a case where the print history information request command is the GDA command and the disclosure restriction information does not indicate any item corresponding to the information included in the document information.

Further, when the print history information request command is the GJA command, the printer 10 determines whether or not the disclosure restriction information indicates an item that is same as the item corresponding to the item of the information requested by the GJA command. The printer 10 determines YES to S405 and proceeds to S410 in a case where the print history information request command is the GJA command and the disclosure restriction information indicates the item that is same as the item of the information requested by the GJA command. On the other hand, the printer 10 determines NO to S405 and proceeds to S430 in a case where the print history information request command is the GJA command and the disclosure restriction information does not indicate the item that is same as the item of the information requested by the GJA command. Due to this, the processes of S410 to S425 are suppressed from being executed despite the print history information request command requesting sending of the non-restricted history information, of which disclosure to the non-disclosure-targeted user is not restricted. Thus, the processing load on the printer 10 can be reduced.

S410 and S415 are same as S220 and S225 of FIG. 7. In a case where the process of S410 had been completed as authentication succeeded, the printer 10 determines YES to S415 and proceeds to S420. On the other hand, in a case where the process of S410 had been completed as authentication failed, the printer 10 determines NO to S415 and terminates the process of FIG. 9.

In S420, the printer 10 executes a disclosure determination process (FIG. 10) for determining whether or not the user of the target PC is the disclosure-targeted user.

In S425, the printer 10 determines whether or not the disclosure determination process of S420 had been completed as disclosure END indicating that the user of the target PC is the disclosure-targeted user. In a case where the process of S420 had been completed as disclosure END, the printer 10 determines YES to S425 and proceeds to S430. On the other hand, in a case where the process of S420 had been completed as restriction END indicating that the user of the target PC is not the disclosure-targeted user, the printer 10 determines NO to S425 and proceeds to S435.

In S430, the printer 10 sends the information requested by the print history information request command to the target PC (such as in T104 and T114 of FIG. 4). When the process of S430 is completed, the process of FIG. 9 is terminated.

In S435, the printer 10 sends only the non-restricted history information among the information requested by the print history information request command to the target PC. When the process of S435 is completed, the process of FIG. 9 is terminated.

Figure 10:
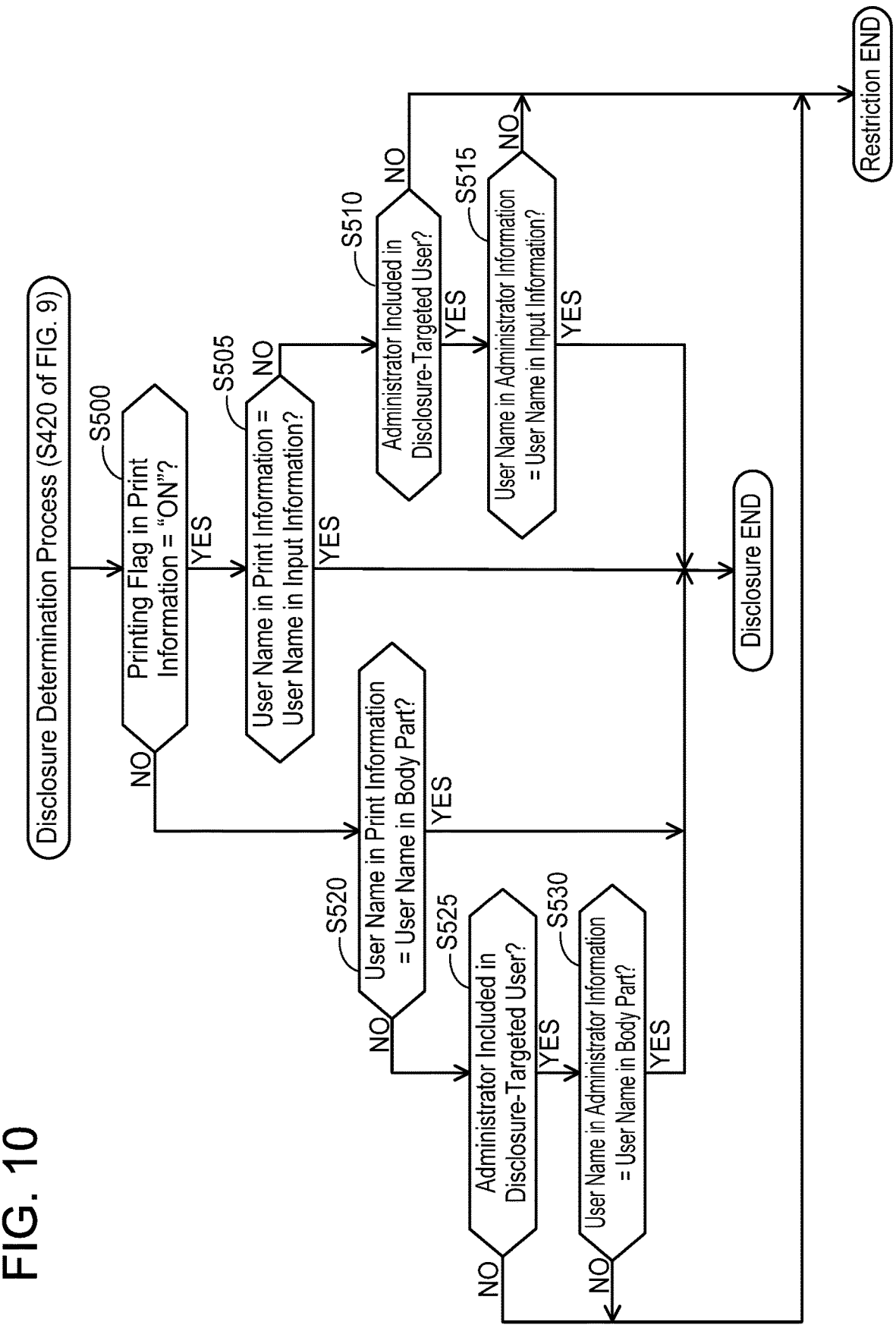
FIG. 10 shows a flowchart of a disclosure determination process.

(Disclosure Determination Process; FIG. 10)

Next, details of the disclosure determination process executed in S420 of FIG. 9 will be described with reference to FIG. 10. In S500, the printer 10 determines whether or not the printing flag included in the print information in the print information table 38 indicates "ON". In a case of determining that the printing flag indicates "ON" (YES to S500), the printer 10 proceeds to S505. On the other hand, in a case of determining that the printing flag indicates "OFF" (NO to S500), the printer 10 proceeds to S520.

In S505, the printer 10 determines whether or not the user name included in the print information and the user name included in a header part of the received print history information request command match each other. In determining that the two user names match (YES to S505), the printer 10 determines that the user of the target PC is the disclosure-targeted user and terminates the process of FIG. 10 as disclosure END. On the other hand, in determining that the two user names do not match (NO to S505), the printer 10 proceeds to S510.

In S510, the printer 10 determines whether or not the administrator is included in the disclosure-targeted user.

Specifically, the printer 10 determines whether or not the disclosure user information stored in the disclosure restriction table 42 indicates the administrator as the disclosure-targeted user. When the disclosure user information indicates the administrator, the printer 10 determines that the administrator is included in the disclosure-targeted user (YES to S510) and proceeds to S515. On the other hand, when the disclosure user information does not indicate the administrator, the printer 10 determines that the administrator is not included in the disclosure-targeted user (NO to S510). In this case, the printer 10 determines that the user of the target PC is not the disclosure-targeted user and terminates the process of FIG. 10 as restriction END.

In S515, the printer 10 determines whether or not the user name UN0 included in the administrator information 44 stored in the memory 34 and the user name in the input information included in the header part of the received print history information request command match each other. In determining that the two user names match (YES to S515), the printer 10 determines that the user of the target PC is the disclosure-targeted user and terminates the process of FIG. 10 as disclosure END. On the other hand, in determining that the two user names do not match (NO to S515), the printer 10 determines that the user of the target PC is not the disclosure-targeted user and terminates the process of FIG. 10 as restriction END.

In S520, the printer 10 determines whether or not the user name included in the print information and the user name included in a body part of the received print history information request command match each other. In determining that the two user names match (YES to S520), the printer 10 determines that the user of the target PC is the disclosure-targeted user and terminates the process of FIG. 10 as disclosure END. On the other hand, in determining that the two user names do not match (NO to S520), the printer 10 proceeds to S525.

S525 is same as S510. When the disclosure user information indicates the administrator, the printer 10 determines that the administrator is included in the disclosure-targeted user (YES to S525) and proceeds to S530. On the other hand, when the disclosure user information does not indicate the administrator, the printer 10 determines that the administrator is not included in the disclosure-targeted user (NO to S525). In this case, the printer 10 determines that the user of the target PC is not the disclosure-targeted user and terminates the process of FIG. 10 as restriction END.

In S530, the printer 10 determines whether or not the user name UN0 included in the administrator information 44 stored in the memory 34 and the user name included in the body part of the received print history information request command match each other. In determining that the two user names match (YES to S530), the printer 10 determines that the user of the target PC is the disclosure-targeted user and terminates the process of FIG. 10 as disclosure END. On the other hand, in determining that the two user names do not match (NO to S530), the printer 10 determines that the user of the target PC is not the disclosure-targeted user and terminates the process of FIG. 10 as restriction END.

Specific Examples; FIGS. 11 to 14

Next, specific examples realized by the processes of FIGS. 5 to 10 being executed will be described with reference to FIGS. 11 to 14. Firstly, the specific example of the acceptance process will be described with reference to FIG. 11. In an initial state of FIG. 11, the flag 46 of the printer 10 indicates "OFF".

When an acceptance screen display operation instructing to display the acceptance screen is accepted from the first user in T310, the PC 100 sends the acceptance screen request to the printer 10 in T312.

In receiving the acceptance screen request from the PC 100 in T312 (NO to S5 and NO to S10 of FIG. 5), the printer 10 sends the acceptance screen data to the PC 100 in T314 (S100 of FIG. 6).

When the acceptance screen data is received from the printer 10 in T314, the PC 100 displays the acceptance screen in T316. Then, when the input of the job name and the print settings in the first input box, the input of the print user in the second input box, and the selection of the OK button in the acceptance screen are accepted from the first user in T320, the PC 100 sends the disclosure restriction information and the disclosure user information to the printer 10 in T322. The disclosure restriction information indicates the job name and the print settings. The disclosure user information indicates the print user as the disclosure-targeted user.

In receiving the disclosure restriction information and the disclosure user information from the PC 100 in T322 (S105 of FIG. 6), the printer 10 determines that the flag 46 stored in the memory 34 indicates "OFF" (NO to S110), and sends the notification screen data to the PC 100 in T324 (S120).

When the notification screen data from the printer 10 is received in T324, the PC 100 displays the notification screen in T326. Then, when the URI "U" in the notification screen is selected by the first user in T330, the PC 100 sends the flag change screen request including the URI "U" to the printer 10 in T332.

In receiving the flag change screen request from the PC 100 in T332 (NO to S5 and YES to S10 of FIG. 5), the printer 10 sends the flag change screen data corresponding to the URI "U" included in the flag change screen request to the PC 100 in T334 (S15).

In receiving the flag change screen data from the printer 10 in T334, the PC 100 displays the flag change screen in T336. Then, when the OK button in the flag change screen is selected by the first user in T340, the PC 100 sends the flag change request to the printer 10 in T342.

In receiving the flag change request from the PC 100 in T342 (S20 of FIG. 5), the printer 10 changes the flag 46 stored in the memory 34 from "OFF" to "ON" in T344 (S25).

Figure 11:
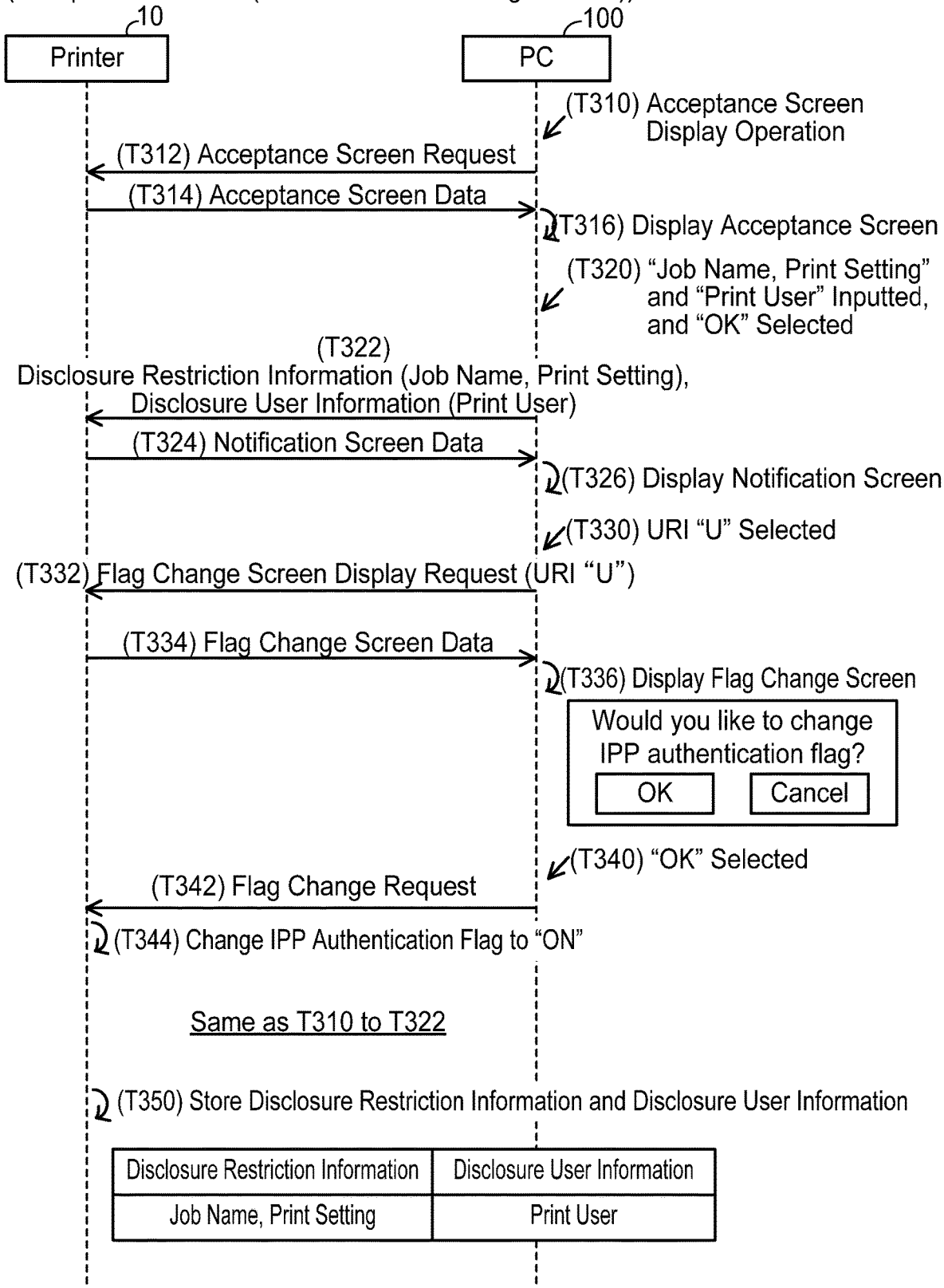
FIG. 11 shows a sequence diagram of the acceptance process.

After this, processes similar to T310 to T322 are executed, by which the printer 10 receives the disclosure restriction information and the disclosure user information from the PC 100 (S105 of FIG. 6). In this case, the printer 10 determines that the flag 46 stored in the memory 34 indicates "ON" (YES to S110), and stores the received disclosure restriction information and disclosure user information in association with each other in the disclosure restriction table 42 in T350 (S115). When the process of T350 is completed, the process of FIG. 11 is terminated.

Figure 12:
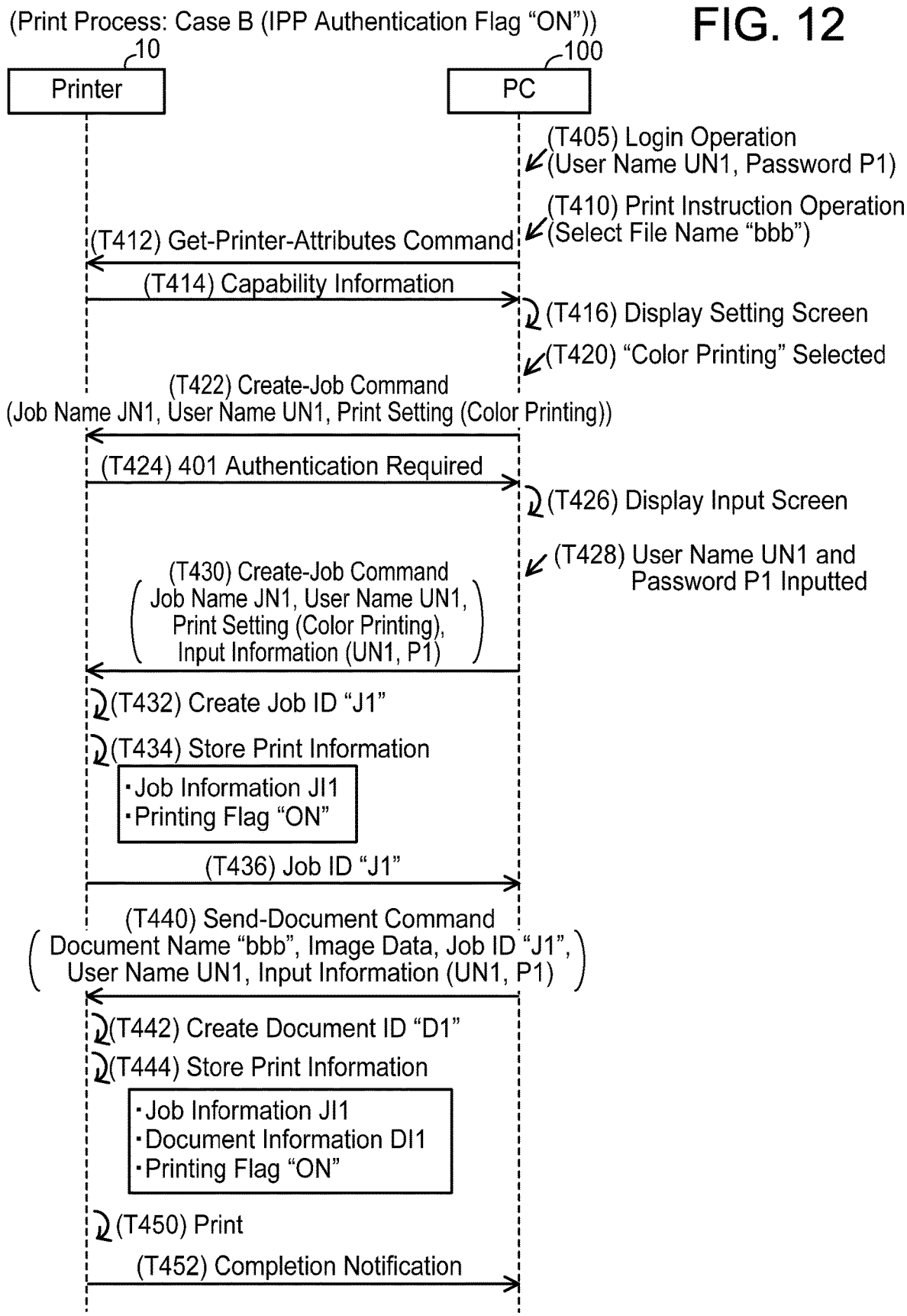
FIG. 12 shows a sequence diagram of the print process in Case B.

(Print Process (Case B); FIG. 12)

Next, the print process in Case B in which the flag 46 of the printer 10 indicates "ON" will be described with reference to FIG. 12. FIG. 12 assumes a situation that takes place after the process of FIG. 11 is executed. As such, in an initial state of FIG. 12, the flag 46 of the printer 10 indicates "ON".

T405 to T422 are same as T5 to T30 of FIG. 3. In receiving the CJ command from the PC 100 in T422 (YES to S5 and NO to S35 of FIG. 5 and NO to S200 and YES to S210 of FIG. 7), the printer 10 determines that the flag 46 stored in the memory 34 indicates "ON" (YES to S215). Then, the printer 10 determines that the input information is not included in the header part of the CJ command (NO to S300 of FIG. 8) and sends the 401 command to the PC 100 in T424 (S310).

In receiving the 401 command from the printer 10 in T424, the PC 100 displays the input screen in T426. Then, when the user name UN1 and the password P1 are inputted to the input screen by the first user in T428, the PC 100 sends the CJ command to the printer 10 in T430. The header part of this CJ command includes the input information including the user name UN1 and the password P1. Further, the body part of this CJ command includes the job name JN1 being the name of the program that created the document selected in T410, the user name UN1 logged in in T405, and the print settings selected in T420 (that is, the color printing).

In receiving the CJ command from the PC 100 in T430 (YES to S5 and NO to S35 of FIG. 5 and NO to S200 and YES to S210 of FIG. 7), the printer 10 determines that the flag 46 stored in the memory 34 indicates "ON" (YES to S215). Further, the printer 10 determines that the input information is included in the header part of the CJ command (YES to S300 of FIG. 8) and further determines that the combination of the user name UN1 and the password P1 in the input information is registered in the user table 40 (YES to S305), and executes processes from T432.

T432 to T436 are same as T32 to T36 of FIG. 3 except that the printing flag indicating "ON" is used. In T440, the PC 100 sends the SD command to the printer 10. The header part of this SD command includes the input information including the user name UN1 and the password P1 inputted in T428. The body part of this SD command includes the document name being the file name "bbb" selected in T410, the image data selected in T410, the job ID "J1" received in T436, and the user name UN1 logged in in T405.

In a case of receiving the SD command from the PC 100 in T440 (YES to S5 and NO to S35 of FIG. 5 and NO to S200 and NO to S210 of FIG. 7), the printer 10 determines that the flag 46 stored in the memory 34 indicates "ON" (YES to S215). Further, the printer 10 determines that the input information is included in the header part of the SD command (YES to S300 of FIG. 8), and further determines that the combination of the user name UN1 and the password P1 in the input information is registered in the user table 40 (YES to S305), and executes processes from T442.

T442 to T452 are same as T42 to T52 of FIG. 3 except that the printing flag indicating "ON" is used. When the process of T452 is completed, the process of FIG. 12 is terminated.

Figure 13:
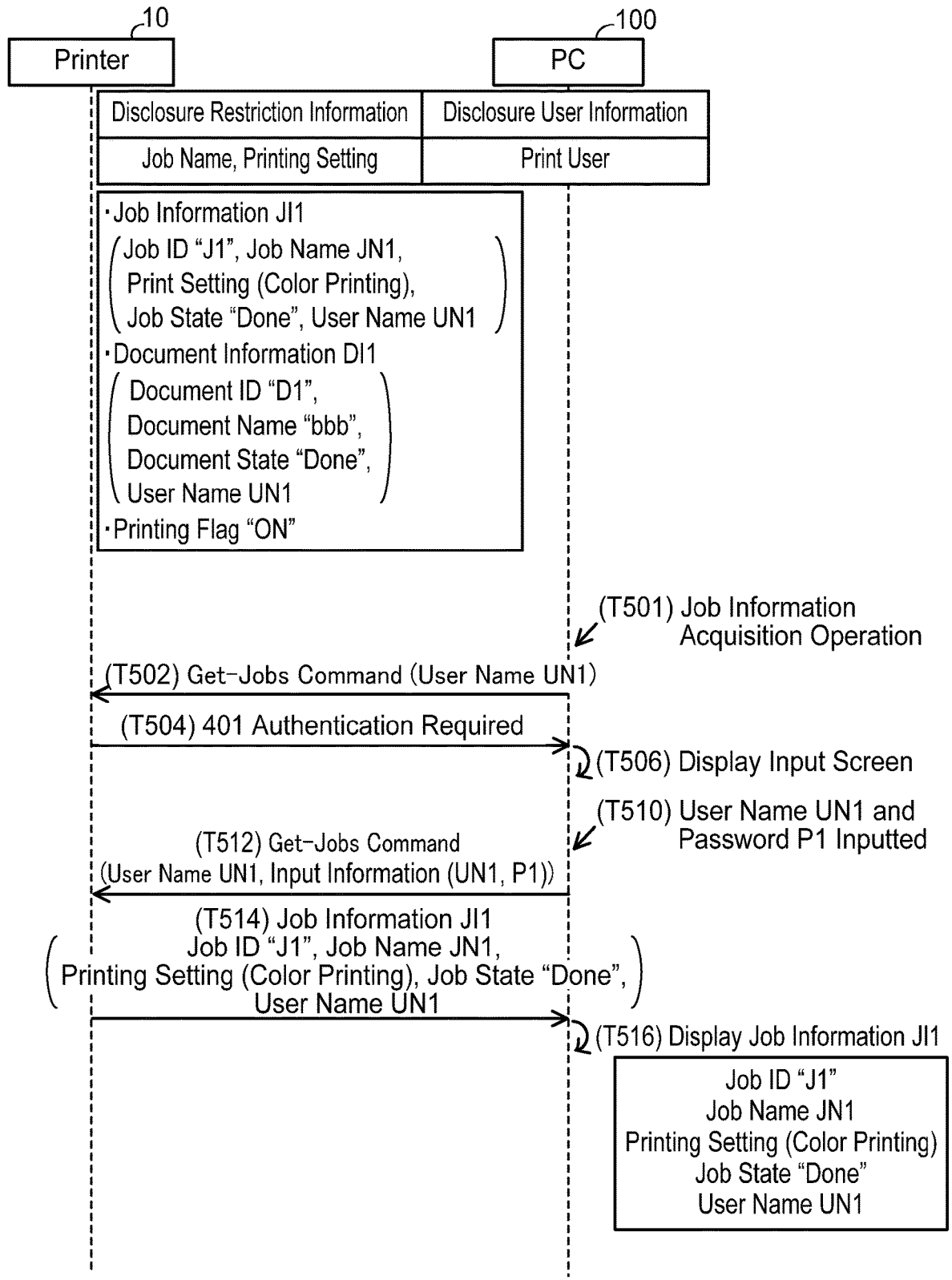
FIG. 13 shows a sequence diagram of the history information sending process in Case B.

(History Information Sending Process (Case B); FIG. 13)

Next, the history information sending process in Case B in which the flag 46 of the printer 10 indicates "ON" and the IPP authentication succeeds will be described with reference to FIG. 13. FIG. 13 assumes a situation that takes place after the process of FIG. 12 is executed. As such, in an initial state of FIG. 13, the flag 46 of the printer 10 indicates "ON". Further, the printer 10 stores the disclosure restriction information, which indicates the job information and the print settings, and the disclosure user information, which indicates the print user, in association with each other. Further, the printer 10 stores the print information including the job information JI1, the document information DI1, and the printing flag indicating "ON". As above, the job information JI1 and the document information DI1 include the user name UN1. As such, the first user is the disclosure-targeted user and the second user is the non-disclosure-targeted user.

T501 and T502 are same as T101 and T102 of FIG. 4. In receiving the GJ command from the PC 100 in T502 (YES to S5 and YES to S35 of FIG. 5), the printer 10 determines that the disclosure restriction information and the disclosure user information are stored in the disclosure restriction table 42 (S400 of FIG. 9), and determines that the disclosure restriction information indicates items corresponding to the information included in the job information (that is, the job name and the print settings) (YES to S405). Further, the printer 10 determines that a header part of the GJ command does not include the input information (NO to S300 of FIG. 8). In this case, the printer 10 sends the 401 command to the PC 100 in T504 (S310).

In receiving the 401 command from the printer 10 in T504, the PC 100 displays the input screen in T506. Then, when the user name UN1 and the password P1 are inputted to the input screen by the first user in T510, the PC 100 sends the GJ command to the printer 10 in T512. The header part of this GJ command includes the input information including the user name UN1 and the password P1 inputted in T510. A body part of this GJ command includes the user name UN1 logged in in T405 of FIG. 12.

In receiving the GJ command from the PC 100 in T512 (YES to S5 and YES to S35 of FIG. 5), the printer 10 determines that the disclosure restriction information and the disclosure user information are stored in the disclosure restriction table 42 (S400 of FIG. 9), and determines that the disclosure restriction information indicates the items corresponding to the information included in the job information (that is, the job name and the print settings) (YES to S405). Further, the printer 10 determines that the header part of the GJ command includes the input information (NO to S300 of FIG. 8) and further determines that the combination of the user name UN1 and the password P1 in the input information is registered in the user table 40 (YES to S305).

Then, the printer 10 determines whether or not the user of the PC 100 (that is, the first user) is the disclosure-targeted user. Specifically, the printer 10 determines that the printing flag included in the print information indicates "ON" (YES to S500 of FIG. 10) and determines that the user name UN1 included in the job information JI1 in the print information matches the user name UN1 in the input information included in the header part of the GJ command (YES to S505). That is, the printer 10 determines that the first user is the disclosure-targeted user. In this case, the printer 10 sends the job information JI1 to the PC 100 in T514.

In receiving the job information JI1 from the printer 10 in T514, the PC 100 displays the job information JI1 in T516. Due to this, the first user being the print executing user can acknowledge the respective information in the job information JI1 even under the situation where the flag 46 of the printer 10 indicates "ON". When the process of T516 is completed, the process of FIG. 13 is terminated.

Figure 14:
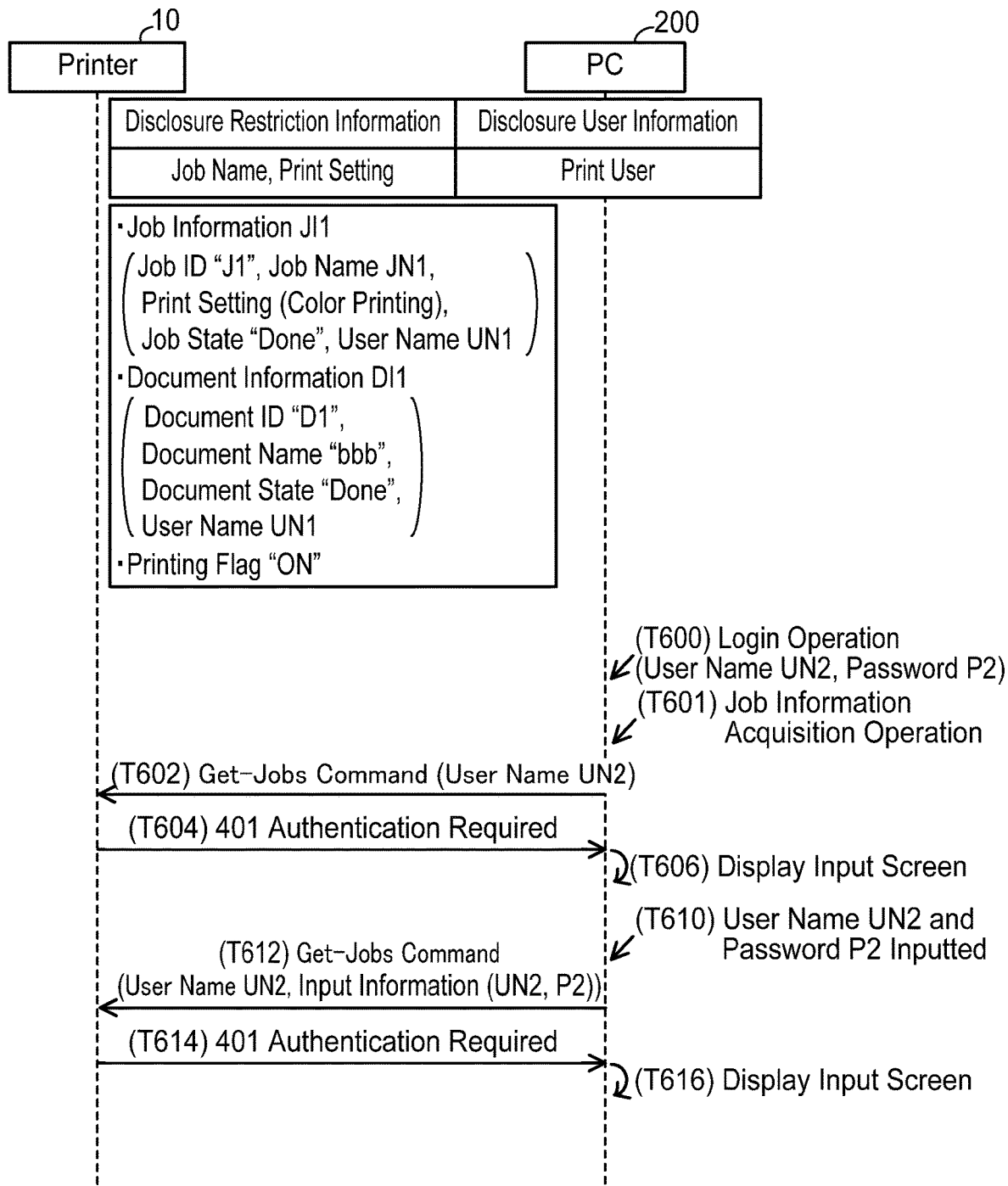
FIG. 14 shows a sequence diagram of the history information sending process in Case C.

(History Information Sending Process (Case C); FIG. 14)

Next, the history information sending process in Case C in which the flag 46 of the printer 10 indicates "ON" and the IPP authentication fails will be described with reference to FIG. 14. FIG. 14 assumes the situation that takes place after the process of FIG. 12 is executed. As such, in an initial state of FIG. 14, the flag 46 of the printer 10 indicates "ON". Further, the printer 10 stores the disclosure restriction information, which indicates the job information and the print settings, and the disclosure user information, which indicates the print user, in association with each other. Further, the printer 10 stores the print information including the job information JI1, the document information DI1, and the printing flag indicating "ON".

T600 to T602 are same as T110 to T112 of FIG. 4. In receiving the GJ command from the PC 200 in T602 (YES to S5 and YES to S35 of FIG. 5), the printer 10 determines that the disclosure restriction information and the disclosure user information are stored in the disclosure restriction table 42 (S400 of FIG. 9), and determines that the disclosure restriction information indicates items corresponding to the information included in the job information (that is, the job name and the print settings) (YES to S405). Further, the printer 10 determines that the header part of the GJ command does not include the input information (NO to S300 of FIG. 8). In this case, the printer 10 sends the 401 command to the PC 200 in T604 (S310).

In receiving the 401 command from the printer 10 in T604, the PC 200 displays the input screen in T606. Then, when the user name UN2 and the password P2 are inputted to the input screen by the second user in T610, the PC 200 sends the GJ command to the printer 10 in T612. The header part of this GJ command includes the input information including the user name UN2 and the password P2 inputted in T610. The body part of this GJ command includes the user name UN2 logged in in T600.

In receiving the GJ command from the PC 200 in T612 (YES to S5 and YES to S35 of FIG. 5), the printer 10 determines that the disclosure restriction information and the disclosure user information are stored in the disclosure restriction table 42 (S400 of FIG. 9), and determines that the disclosure restriction information indicates the items corresponding to the information included in the job information (that is, the job name and the print settings) (YES to S405). Further, the printer 10 determines that the header part of the GJ command includes the input information (NO to S300 of FIG. 8) and further determines that a combination of the user name UN2 and the password P2 in the input information is not registered in the user table 40 (NO to S305). In this case, the printer 10 sends the 401 command to the PC 200 again in T614. As a result of this, the input screen is displayed in T616 in the PC 200, however, since the second user does not know the correct user name and password, the user name and the password cannot be newly inputted to the input screen. As such, under the situation in which the flag 46 of the printer 10 indicates "ON", the second user who is different from the print executing user (which is the first user) cannot acknowledge the respective information in the job information JI1. When the process of T616 is completed, the process of FIG. 14 is terminated.

Figure 15:
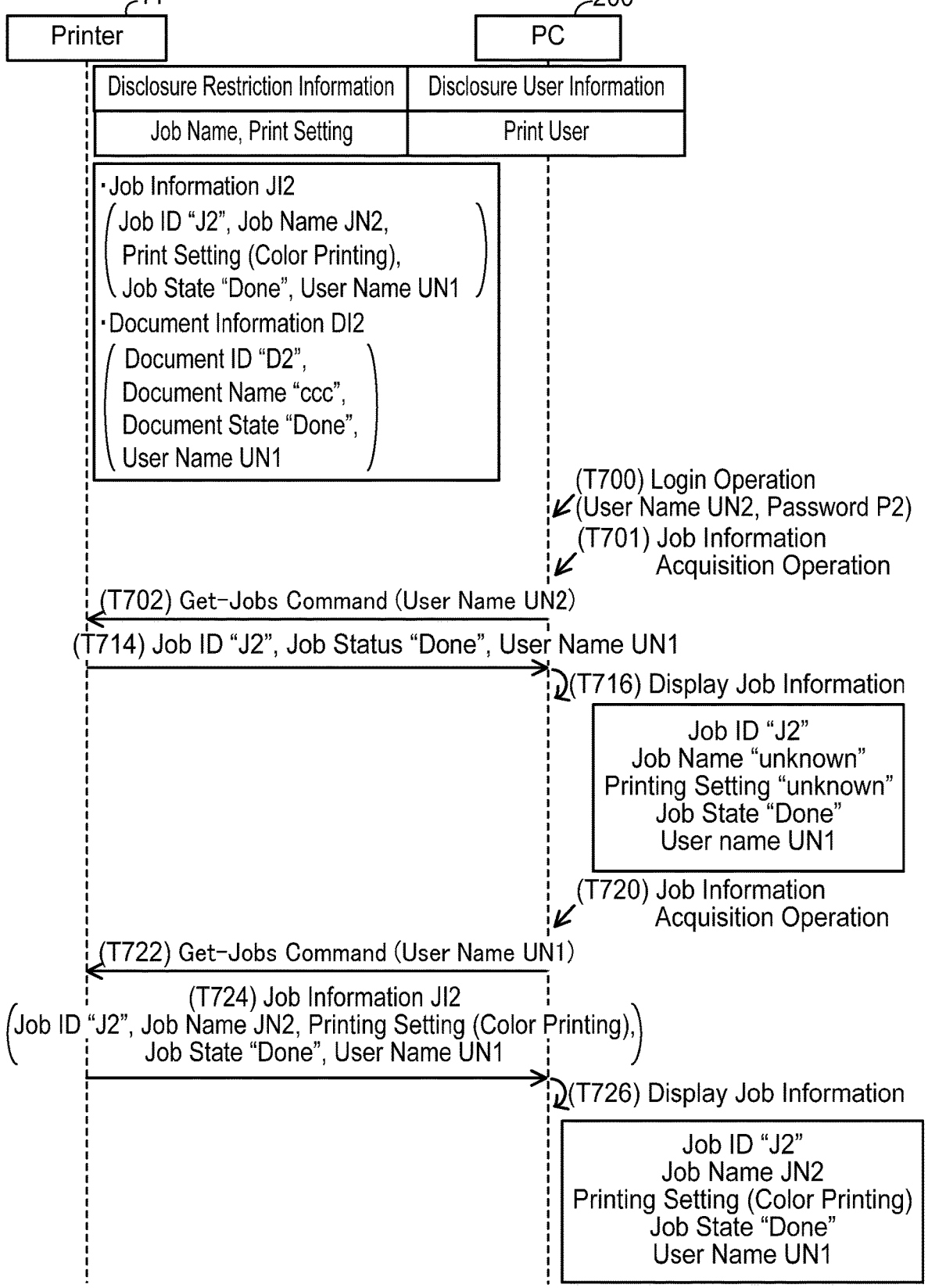
FIG. 15 shows a sequence diagram of a process in a comparative example.

Comparative Example; FIG. 15

Here, a comparative example in which the IPP authentication process is not executed in the history information sending process will be described with reference to FIG. 15. A printer 11 of the comparative example stores disclosure restriction information, which indicates a job name and print settings, and disclosure user information, which indicates a print user, in association with each other. Further, the printer 11 stores print information including job information JI2 being a history of printing executed according to instructions from the first user and document information DI2. The job information JI2 includes a job ID "J2", a job name JN2, the print settings, a job state "done", and the user name UN1. The document information DI2 includes a document ID "D2", a document name "ccc", a document state "done", and the user name UN1.

T700 to T702 are same as T110 to T112 of FIG. 4 except that the printer 11 is used. In receiving the GJ command from the PC 200 in T702, the printer 11 determines that the user name UN1 included in the job information JI2 and the user name UN2 included in the GJ command do not match. In this case, the printer 11 determines that the second user is not the disclosure-targeted user, and sends the job ID "J2", the job state "done", and the user name UN1 included in the job information JI2 to the PC 200 in T704. As a result of this, job information including the job ID "J2", a letter string "unknown" as the job name, a letter string "unknown" as the print settings, the job state "done", and the user name UN1 is displayed in the PC 200 in T706. Due to this, the second user can acknowledge the user name UN1 of the first user who is the print executing user.

After this, when the second user executes the job information acquisition operation on the PC 200 to send the GJ command including the user name UN1 in T710, the GJ command including the user name UN1 is sent from the PC 200 to the printer 11 in T712. In this case, the printer 11 determines that the user name UN1 included in the job information JI2 and the user name UN1 included in the GJ command match, and sends the job information JI2 to the PC 200 in T714. As a result of this, the job information JI2 is displayed in the PC 200 in T716. Due to this, the second user who is different from the print executing user (which is the first user) can acknowledge the respective information in the job information JI2. When the process of T716 is completed, the process of FIG. 15 is terminated.

Effects of Present Embodiment

As above, in the comparative example, when the second user obtains the user name UN1, the second user can use the user name UN1 to obtain the job information JI2. Contrary to this, in the present embodiment, the printer 10 sends the job information JI1 including the restricted history information (being the job name JN1 and the print settings (which is the color print)) and the non-restricted history information (being the job ID "J1", the job state "done", and the user name UN1) to the PC 100 in the case of determining that the password P1 stored in the memory 34 and the password P1 included in the input information match, and further determining that the first user is the disclosure-targeted user (such as Case B of FIG. 13). On the other hand, the printer 10 does not send the job information JR to the PC 200 in the case of determining that the password P1 stored in the memory 34 and the password P2 included in the input information do not match (such as Case C of FIG. 14). Due to this, for example, even if the second user obtains the user name UN1, the printer 10 can determine in the IPP authentication process that the password P1 stored in the memory 34 does not match the password included in the input information so long as the second user does not know the password P1. As a result of this, the restricted history information can be suppressed from being sent to the non-disclosure-targeted user.

Further, in the above embodiment, the printer 10 executes the IPP authentication process that is same as a conventionally-known IPP authentication process in the history information sending process. Due to this, there is no need to develop a new authentication scheme for the print history information request command, and R&D cost for the printer 10 can thereby be reduced. Further, the printer 10 executes the authentication process in the print process as well as the authentication process in the history information sending process by using the user name and the password stored in the user table 40. For example, if a configuration is assumed in which the authentication process in the history information sending process is executed by using authentication information that is different from the user name and the password used in the authentication process in the print process, the printer 10 must store the user name and the password used in the authentication process in the print process as well as the authentication information used in the authentication process in the history information sending process. Contrary to this, in the present embodiment, since the printer 10 simply needs to store only the user name and the password stored in the user table 40, a capacity of the memory 34 of the printer 10 can be saved.

Further, in the present embodiment, under the situation in which the flag 46 of the printer 10 indicates "ON", the printer 10 stores the user name, which is in the input information included in the header part of the CJ command, in the job information (S240 of FIG. 7) and stores the user name, which is in the input information included in the header part of the SD command, in the document information (S270). Here, for example, a configuration of a comparative example will be assumed in which the printer 10 stores the user name, which is included in the body part of the CJ command, in the job information and stores the user name, which is included in the body part of the SD command, in the document information under the situation in which the flag 46 of the printer 10 indicates "ON". In this case, the printer 10 executes the processes of S520 to S530 without executing the processes of S500 to S515 of FIG. 10. That is, the printer 10 determines whether or not the user of the target PC is the disclosure-targeted user by using the user name included in the body part of the print history information request command without using the user name in the input information.

However, according to such a configuration of the comparative example, the job information and the document information can be obtained by the non-disclosure-targeted user using the following method. That is, for example, when the second user inputs the user name and the password registered in the user table 40 of the printer 10 (such as a user name UN3 and a password P3) to the input screen in T610 of FIG. 14, and further performs an operation to send the GJ command including the user name UN1 in the body part, the GJ command that includes the input information including the user name UN3 and the password P3 in the header part and the user name UN1 in the body part is sent to the printer 10 from the PC 200. In this case, the printer 10 determines that the user name UN1 included in the job information JI1 and the user name UN1 in the input information included in the body part of the received GJ command match, and thus sends the job information JI1 to the PC 200. As a result of this, since the job information JI1 is displayed in the PC 200, the second user who is different from the print executing user (which is the first user) can acknowledge the respective information in the job information JI1. Contrary to this, in the present embodiment, under the situation in which the flag 46 of the printer 10 indicates "ON", the printer 10 stores the user name, which is in the input information included in the header part of the CJ command, in the job information and stores the user name, which is in the input information included in the header part of the SD command, in the document information. Due to this, even in the aforementioned situation, for example, the printer 10 can determine in the disclosure determination process that the user name UN1 included in the job information JI1 and the user name UN3 included in the input information in the body part of the received GJ command do not match and thereby determine that the second user is not the disclosure-targeted user. Due to this, for example, even if the user name UN1 is obtained by a third party, the restricted history information can be suppressed from being sent to the non-disclosure-targeted user. In a variant, the configuration of the aforementioned comparative example may be employed.

In the present embodiment, "disclosure" means that the printer 10 sends information requested by a print history information request command to an external device (such as the PC 100) in response to receiving this print history information request command therefrom.

(Corresponding Relationship)

The PCs 100, 200 are examples of a "first external device" and the PC 100 is an example of a "second external device" and a "third external device". When the GJ command is an example of a "history request", the job information is an example of "print history information". When the GDA command is an example of the "history request", the document information is an example of the "print history information". The password P1 is an example of "first authentication information" and "third authentication information", and the passwords P1, P2 are examples of "second authentication information". The 401 command and the SD command are respectively an example of an "input information request" and a "print request". The user name UN1 is an example of "first user identification information", "second user identification information", and "third user identification information". The flag 46 indicating "ON" is an example of "authentication execution information". The printing flag indicating "ON" and the printing flag indicating "OFF" are respectively an example of "storing information" and "non-storing information". The GJA command is an example of "non-restricted history request". The user name UN0 included in the administrator information 44 is an example of "administrator identification information".

Figure 9:
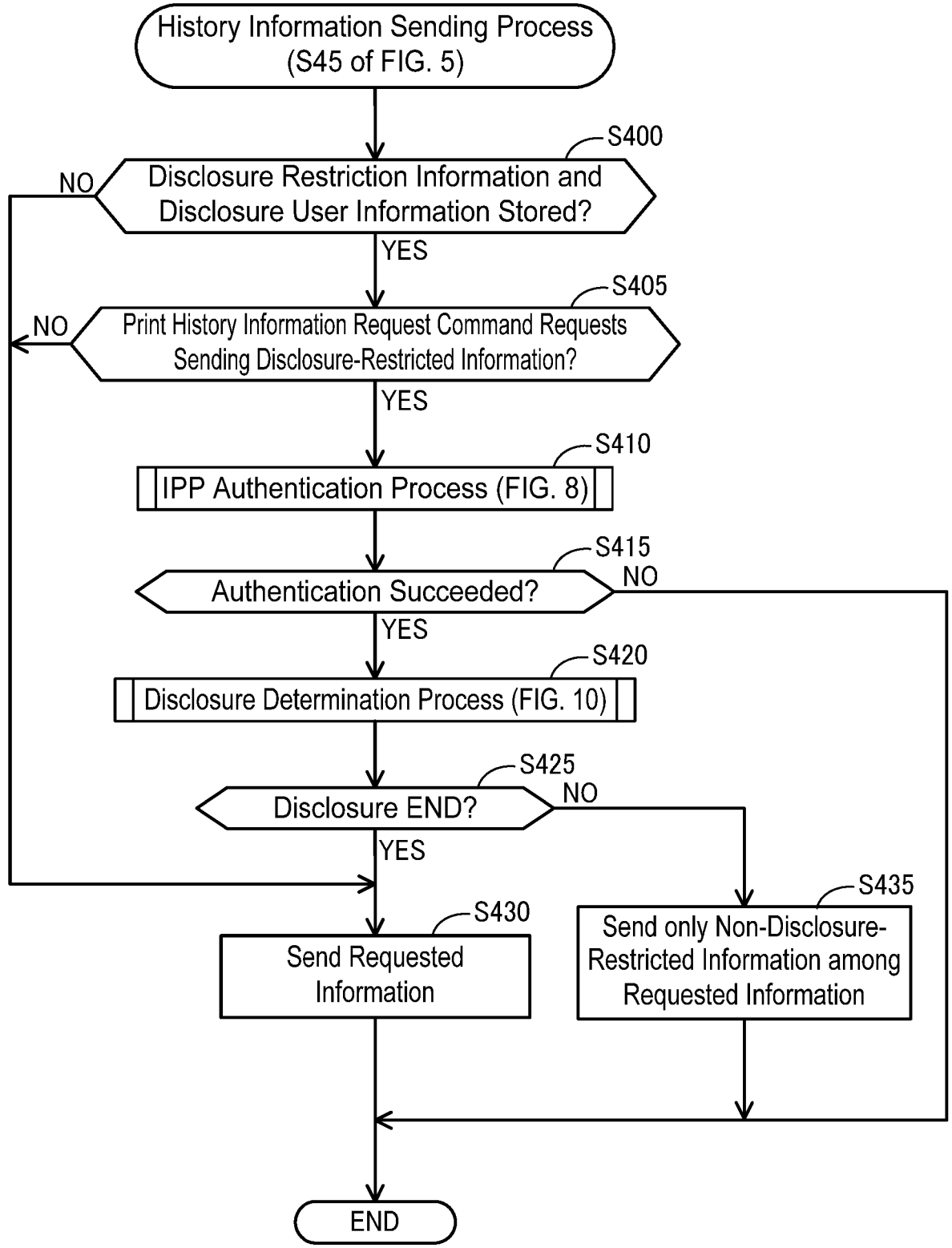
FIG. 9 shows a flowchart of a history information sending process.

The process of S5 of FIG. 5, the process of S220 (or S260 or S410) of FIG. 7, the process of S420, the process of S430, and the process of S435 of FIG. 9 are respectively examples of "receive a history request", "execute an authentication process", "determine whether a specific user is the disclosure-targeted user", "send the print history information", and "send the non-restricted history information".

(Variant 1) The printer 10 may execute the IPP authentication process by using a hash value instead of the user name and the password. That is, the printer 10 may execute the IPP authentication process by using a so-called Digest authentication. In this case, the printer 10 determines that a hash value is not included in the header part of the GJ command in receiving the GJ command from the PC 100 in T502 of FIG. 13, for example, creates a random value RV1 and sends the 401 command including the random value RV1 to the PC 100. In this case, the PC 100 displays the input screen, and when the user name UN1 and the password P1 are inputted to the input screen by the first user, it creates a random value RV2 that differs from the received random value RV1 and creates a hash value HV by hashing the inputted user name UN1, the inputted password P1, the received random value RV1, and the created random value RV2. Then, the PC 100 sends the created hash value HV and the created random value RV2 to the printer 10. In receiving the hash value HV and the random value RV2 from the PC 100, the printer 10 sequentially uses user names and passwords stored in the user table 40 and hashes the user names and the passwords, the created random value RV1, and the received random value RV2 to create a plurality of hash values and store the same temporarily in the memory 34. Then, when a hash value that is same as the received hash value HV is included among the stored plurality of hash values, the printer 10 sends the job information JI1 to the PC 100. When there is no hash value that is same as the received hash value HV included among the stored plurality of hash values, the printer 10 does not send the job information JI1 to the PC 100. In this variant, the hash values that are temporarily stored in the memory 34 are examples of the "first authentication information". Further, the hash value HV obtained by using the password P1 inputted to the PC 100 is an example of "second authentication information inputted to the first external device".

(Variant 2) The processes of S215 to S225 and the processes of S250 to S260 of FIG. 7 may be omitted. That is, an "authentication process" may not include "sending the input information request", "receiving second input information", and "determining whether the first authentication information in the memory matches the third authentication information".

(Variant 3) The processes of S110 and S120 of FIG. 6 may be omitted. That is, in this variant, "send notification screen data" may be omitted.

(Variant 4) The process of S400 of FIG. 9 may be omitted. That is, "sending an input information request" may be a process of sending the input information request to the first external device in a case where the history request from the first external device is received before the disclosure restriction information and the disclosure user information are stored in the memory.

(Variant 5) In the above embodiment, the processes of FIGS. 2 to 14 are realized by the CPU 32 of the printer 10 executing the program 36 in the memory 34. However, alternatively, at least one process among those processes may be realized by hardware such as a logic circuit.

What is claimed is:

1. A printer comprising:
   a processor; and
   a memory storing print history information, first authentication information, disclosure restriction information, and disclosure user information,
   wherein the print history information is stored in the memory by execution of a printing according to Internet Printing Protocol (IPP) at the printer, and includes restricted history information and non-restricted history information, the restricted history information being information of which disclosure to a non-disclosure-targeted user is restricted, and the non-restricted history information being information of which disclosure to the non-disclosure-targeted user is not restricted,
   the disclosure restriction information is for the printer to identify the restricted history information and the non-restricted history information in the print history information, and
   the disclosure user information indicates a disclosure-targeted user of the restricted history information,
   wherein the memory further stores computer-readable instructions therein, and the computer-readable instructions, when executed by the processor, cause the printer to:
   receive a history request according to the IPP from a first external device, the history request being for requesting sending of the print history information;
   execute an authentication process,
      wherein the authentication process includes:
         in a case where the history request is received from the first external device, sending an input information request to the first external device, the input information request being for requesting sending of input information;
         in a case where the input information request is sent to the first external device, receiving first input information including first user identification information inputted to the first external device and second authentication information inputted to the first external device from the first external device; and
         in a case where the first input information is received from the first external device, determining whether the first authentication information in the memory matches the second authentication information included in the first input information;
   in the case where the first input information is received from the first external device, determine whether a specific user identified by the first user identification information included in the first input information is the disclosure-targeted user indicated by the disclosure user information;
   in a case where it is determined that the first authentication information matches the second authentication information and it is determined that the specific user is the disclosure-targeted user, send according to the IPP the print history information including the restricted history information and the non-restricted history information to the first external device as a response to the history request, wherein in a case where it is determined that the first authentication information does not match the second authentication information, the print history information is not sent; and
   in a case where it is determined that the first authentication information matches the second authentication information and it is determined that the specific user is not the disclosure-targeted user, send according to the IPP the non-restricted history information to the first external device as a response to the history request.

2. The printer as in claim 1, further comprising
   a print executing unit,
   wherein the computer-readable instructions, when executed by the processor, further cause the printer to:
   in a case where a print instruction for causing the printer to execute printing is given to a second external device, receive a print request according to the IPP from the second external device,
   wherein the authentication process further includes:
      in a case where the print request is received from the second external device, sending the input information request to the second external device;
      in a case where the input information request is sent to the second external device, receiving second input information including second user identification information inputted to the second external device and third authentication information inputted to the second external device from the second external device,
      in a case where the second input information is received from the second external device, determining whether the first authentication information in the memory matches the third authentication information included in the second input information,
   wherein the computer-readable instructions, when executed by the processor, further cause the printer to:
   in a case where it is determined that the first authentication information matches the third authentication information, cause the print executing unit to execute printing according to the IPP, wherein in a case where it is determined that the first authentication information does not match the third authentication information, the printing is not executed; and
   in a case where the printing is executed, store the print history information in the memory.

3. The printer as in claim 2, wherein
the print request includes third user identification information inputted to the second external device,
in the case where the printing is executed, the print history information including the third user identification information is stored in the memory,
in a case where the disclosure user information indicates a user who has caused the printer to execute printing as the disclosure-targeted user and the first user identification information included in the first input information matches the third user identification information included in the print history information, it is determined that the specific user is the disclosure-targeted user, and
in a case where the disclosure user information indicates the user who has caused the printer to execute printing as the disclosure-targeted user and the first user identification information included in the first input information does not match the third user identification information included in the print history information, it is determined that the specific user is not the disclosure-targeted user.

4. The printer as in claim 3, wherein
the memory is configured capable of storing authentication execution information indicating that the printer is to execute the authentication process,
in a case where the authentication execution information is stored in the memory, the authentication process is executed,
in a case where the authentication execution information is not stored in the memory, the authentication process is not executed,
in a case where the printing is executed under a situation where the authentication execution information is stored in the memory, the print history information and storing information are stored in the memory in association with each other, the print history information including the third user identification information included in a Hypertext Transfer Protocol (HTTP) header part of the print request, and the storing information indicating the authentication execution information has been stored in the memory,
in a case where the printing is executed under a situation where the authentication execution information is not stored in the memory, the print history information and non-storing information are stored in the memory in association with each other, the print history information including the third user identification information included in the HTTP body part of the print request, and the non-storing information indicating the authentication execution information has not been stored in the memory,
the first input information is a response according to the HTTP,
in a case where the first user identification information included in a header part of the first input information matches the third user identification information included in the print history information under a situation where the print history information and the storing information are stored in the memory in association with each other, it is determined that the specific user is the disclosure-targeted user, and
in a case where the first user identification information included in a body part of the first input information matches the third user identification information included in the print history information under a situation where the print history information and the non-storing information are stored in the memory in association with each other, it is determined that the specific user is the disclosure-targeted user.

5. The printer as in claim 1, wherein
the computer-readable instructions, when executed by the processor, further cause the printer to:
receive a screen request for requesting sending of an acceptance screen from a third external device, the acceptance screen being for accepting an input of the disclosure restriction information and the disclosure user information;
in a case where the screen request is received from the third external device, send acceptance screen data for displaying the acceptance screen to the third external device;
in a case where the input of the disclosure restriction information and the disclosure user information is accepted at the acceptance screen displayed on the third external device after the acceptance screen data has been sent to the third external device, receive the disclosure restriction information and the disclosure user information from the third external device; and
in a case where the disclosure restriction information and the disclosure user information are received from the third external device, store the disclosure restriction information and the disclosure user information in the memory.

6. The printer as in claim 5, wherein
in a case where the history request is received from the first external device after the disclosure restriction information and the disclosure user information have been stored in the memory, the process of sending the input information request to the first external device is executed, and
in a case where the history request is received from the first external device before the disclosure restriction information and the disclosure user information have been stored in the memory, the input information request is not sent.

7. The printer as in claim 5, wherein
the memory is configured capable of storing authentication execution information indicating that the printer is to execute the authentication process,
in a case where the authentication execution information is stored in the memory, the authentication process is executed, and
in a case where the authentication execution information is not stored in the memory, the authentication process is not executed,
wherein the computer-readable instructions, when executed by the processor, further cause the printer to:
in a case where the disclosure restriction information and the disclosure user information are received from the third external device under the situation where the authentication execution information is not stored in the memory, send notification screen data for displaying a notification screen to the third external device, the notification screen being for notifying that the printer is not to execute the authentication process, wherein in a case where the disclosure restriction information and the disclosure user information are received from the third external device under the situation where the authentication execution information is not stored in the memory, the notification screen data is not sent.

8. The printer as in claim 1, wherein
the computer-readable instructions, when executed by the processor, further cause the printer to:

receive a non-restricted history request according to the IPP from a fourth external device, the non-restricted history request being for requesting sending of the non-restricted history information included in the print history information; and in a case where the non-restricted history request is received from the fourth external device, send the non-restricted history information to the fourth external device as a response to the non-restricted history request according to the IPP without executing the authentication process.

9. The printer as in claim 1, wherein
the memory further stores administrator identification information for identifying an administrator of the printer,
in a case where the disclosure user information indicates the administrator as the disclosure-targeted user and the first user identification information matches the administrator identification information, it is determined that the specific user is the disclosure-targeted user, and
in a case where the disclosure user information indicates the administrator as the disclosure-targeted user and the first user identification information does not match the administrator identification information, it is determined that the specific user is not the disclosure-targeted user.

10. The printer as in claim 1, wherein
the history request is one of a Get-Jobs command, a Get-Document-Attributes command, and a Get-Job-Attributes command.

11. The printer as in claim 1, wherein
the print history information is information including a job-object-attribute that is an attribute defined by the IPP, and
the disclosure restriction information is information including a job-privacy-attribute that is an attribute defined by the IPP.

12. The printer as in claim 1, wherein
the disclosure user information is information including a job-privacy-scope that is an attribute defined by the IPP.

13. A non-transitory computer-readable recording medium storing computer-readable instructions for a printer,
wherein the printer comprises a memory storing print history information, first authentication information, disclosure restriction information, and disclosure user information,
wherein the print history information is stored in the memory by execution of a print according to Internet Printing Protocol (IPP) at the printer, and includes restricted history information and non-restricted history information, the restricted history information being information of which disclosure to a non-disclosure-targeted user is restricted, and the non-restricted history information being information of which disclosure to the non-disclosure-targeted user is not restricted, the disclosure restriction information is for the printer to identify the restricted history information and the non-restricted history information in the print history information, and the disclosure user information indicates a disclosure-targeted user of the restricted history information, wherein the computer-readable instructions, when executed by a processor of the printer, cause the printer to:

receive a history request according to the IPP from a first external device, the history request being for requesting sending of the print history information;

execute an authentication process,
wherein the authentication process includes:
in a case where the history request is received from the first external device, sending an input information request to the first external device, the input information request being for requesting sending of input information;
in a case where the input information request is sent to the first external device, receiving first input information including first user identification information inputted to the first external device and second authentication information inputted to the first external device from the first external device; and
in a case where the first input information is received from the first external device, determining whether the first authentication information in the memory matches the second authentication information included in the first input information;

in the case where the first input information is received from the first external device, determine whether a specific user identified by the first user identification information included in the first input information is the disclosure-targeted user indicated by the disclosure user information;

in a case where it is determined that the first authentication information matches the second authentication information and it is determined that the specific user is the disclosure-targeted user, send according to the IPP the print history information including the restricted history information and the non-restricted history information to the first external device as a response to the history request, wherein in a case where it is determined that the first authentication information does not match the second authentication information, the print history information is not sent; and in a case where it is determined that the first authentication information matches the second authentication information and it is determined that the specific user is not the disclosure-targeted user, send according to the IPP the non-restricted history information to the first external device as a response to the history request.

* * * * *